(12) United States Patent
Yamada

(10) Patent No.: US 11,183,141 B2
(45) Date of Patent: Nov. 23, 2021

(54) DISPLAY DEVICE AND METHOD FOR CONTROLLING SAME

(71) Applicant: Wacom Co., Ltd., Saitama (JP)

(72) Inventor: Masahiko Yamada, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/438,563

(22) Filed: Jun. 12, 2019

(65) Prior Publication Data

US 2019/0295495 A1    Sep. 26, 2019

Related U.S. Application Data

(63) Continuation of application No. PCT/JP2017/037315, filed on Oct. 16, 2017.

(30) Foreign Application Priority Data

Jan. 31, 2017  (JP) .............................. JP2017-014995

(51) Int. Cl.
*G09G 5/10* (2006.01)
*G09G 5/373* (2006.01)
*G09G 5/377* (2006.01)
*G06F 3/01* (2006.01)
*G06T 19/00* (2011.01)
*G09G 5/00* (2006.01)

(52) U.S. Cl.
CPC .............. *G09G 5/003* (2013.01); *G06F 3/01* (2013.01); *G06T 19/00* (2013.01); *G09G 5/00* (2013.01); *G09G 5/10* (2013.01); *G09G 5/373* (2013.01); *G09G 5/377* (2013.01); *G09G 2340/045* (2013.01); *G09G 2340/125* (2013.01)

(58) Field of Classification Search
CPC .......... G09G 5/003; G09G 5/10; G09G 5/373; G09G 5/377; G09G 2340/045; G09G 2340/125
See application file for complete search history.

(56) References Cited

U.S. PATENT DOCUMENTS

| 8,941,683 | B2 | 1/2015 | Son et al. |
| 9,595,137 | B2 | 3/2017 | Sharma et al. |
| 2007/0253600 | A1 | 11/2007 | Furukawa et al. |
| 2012/0242865 | A1* | 9/2012 | Vartanian ........... H04N 5/23206 348/239 |
| 2013/0014139 | A1* | 1/2013 | Kawakami .............. G06F 3/017 725/9 |

(Continued)

FOREIGN PATENT DOCUMENTS

| JP | 8-190640 A | 7/1996 |
| JP | 2014-203131 A | 10/2014 |

(Continued)

*Primary Examiner* — Jitesh Patel
(74) *Attorney, Agent, or Firm* — Seed IP Law Group LLP

(57) ABSTRACT

A display device includes: a display having transparency; a first detector which, in operation, detects a position indicated by an indicator on the display; a second detector which, in operation, detects position information and an orientation of the display; and a controller which, in operation, displays a virtual image corresponding to the position information and the orientation detected by the second detector on the display and changes a display mode of the virtual image according to the position indicated by the indicator and detected by the first detector.

14 Claims, 19 Drawing Sheets

(56) References Cited

U.S. PATENT DOCUMENTS

| | | | | |
|---|---|---|---|---|
| 2013/0249895 A1* | 9/2013 | Westerinen | .......... | G09G 3/3406 |
| | | | | 345/419 |
| 2014/0075302 A1* | 3/2014 | Akashi | .................. | G06F 40/166 |
| | | | | 715/268 |
| 2015/0355521 A1* | 12/2015 | Alton | .................... | G01J 1/4204 |
| | | | | 250/214 AL |

FOREIGN PATENT DOCUMENTS

| | | |
|---|---|---|
| JP | 5649842 B2 | 1/2015 |
| TW | 201407419 A | 2/2014 |
| WO | 2006/013639 A1 | 2/2006 |

* cited by examiner

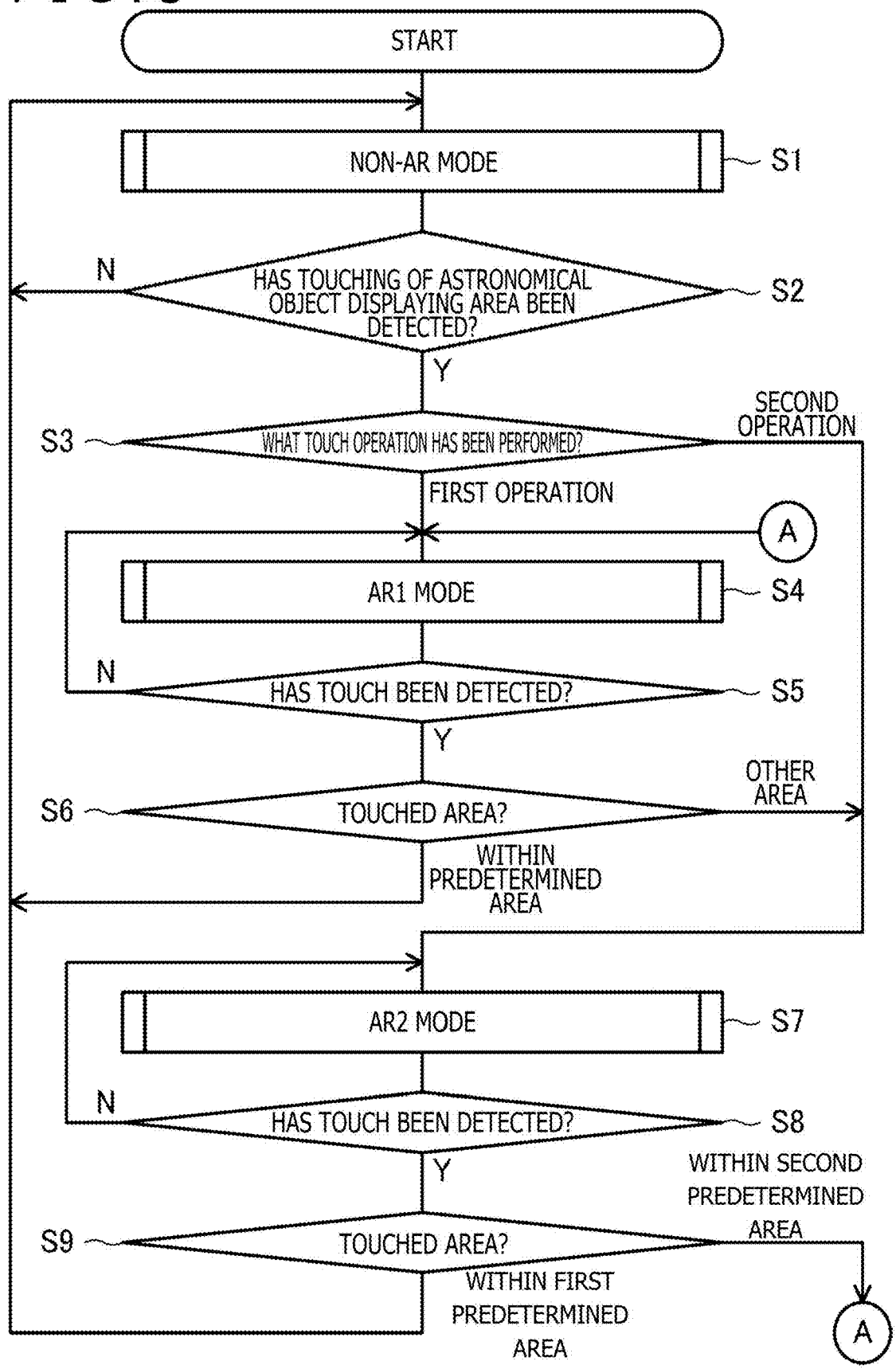

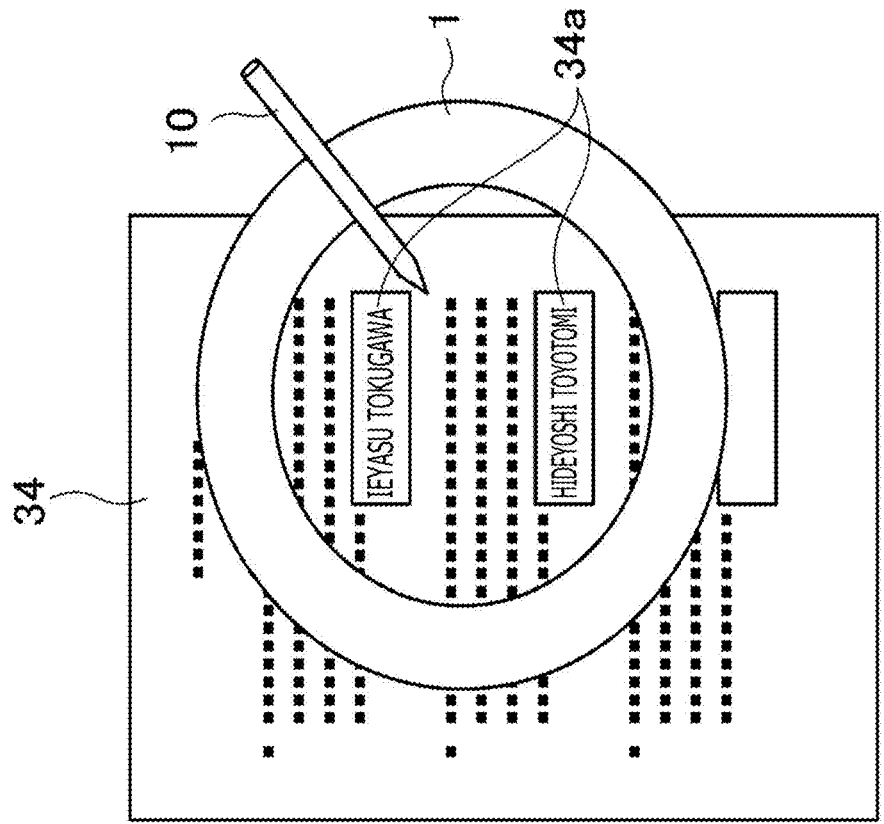
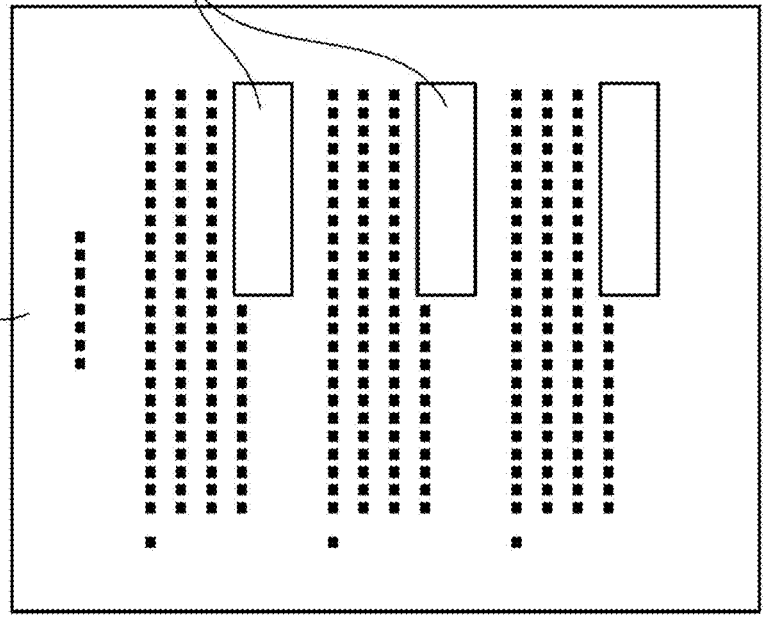

DISPLAY DEVICE AND METHOD FOR CONTROLLING SAME

BACKGROUND

Technical Field

The present disclosure relates to a technique for providing augmented reality by displaying a virtual image on a display.

Background Art

Augmented reality (AR) has been developed to enhance the real world by adding information to the real world. For example, there is a technique for displaying a virtual image on a transparent display (see, for example, U.S. Pat. No. 8,941,683 and Japanese Patent No. 5649842).

However, the conventional technique faces a technical difficulty in changing a display mode of a virtual image.

BRIEF SUMMARY

The present disclosure has been made in view of the technical issue described above. It is an object of the present disclosure to provide a technique for effectively changing a display mode of a virtual image.

According to one embodiment of the present disclosure, a display device includes: a display having transparency; a first detector which, in operation, detects a position indicated by an indicator on the display; a second detector which, in operation, detects position information and an orientation of the display; and a controller which, in operation, displays a virtual image corresponding to the position information and the orientation on the display and changes a display mode of the virtual image according to the position indicated by the indicator.

According to another embodiment of the present disclosure, a method for controlling a display device including a display having transparency includes: detecting a position indicated by an indicator on the display; detecting position information and an orientation of the display; displaying a virtual image corresponding to the position information and the orientation on the display; and controlling changing of a display mode of the virtual image according to the position indicated by the indicator.

According to the present disclosure, a display mode of a virtual image is changed effectively.

BRIEF DESCRIPTION OF THE DRAWINGS

FIG. 5 is a flowchart of the entire operation of a controller depicted in FIG. 2;

FIGS. 20A and 20B are diagrams depicting how the display device according to an eighth embodiment of the present disclosure is used.

DETAILED DESCRIPTION OF THE PREFERRED EMBODIMENTS

Hereinafter, a display device according to embodiments of the present disclosure will be described with reference to the drawings.

Figure 1A:
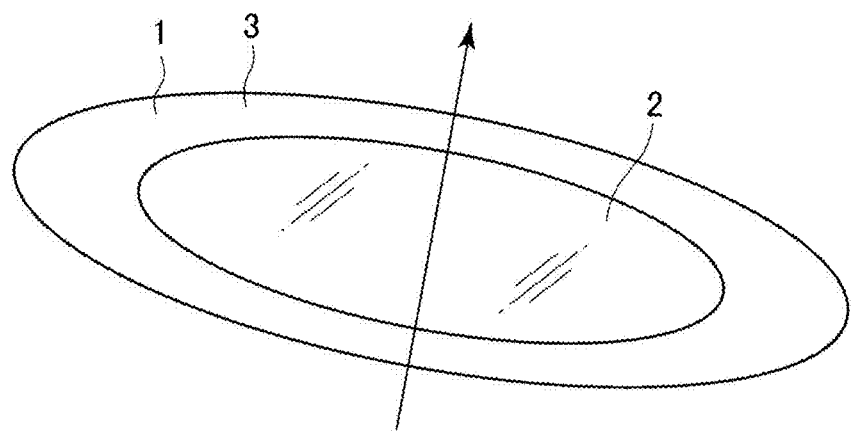
FIGS. 1A and 1B are views of the external appearance of a display device according to a first embodiment of the present disclosure.
Figure 1B:
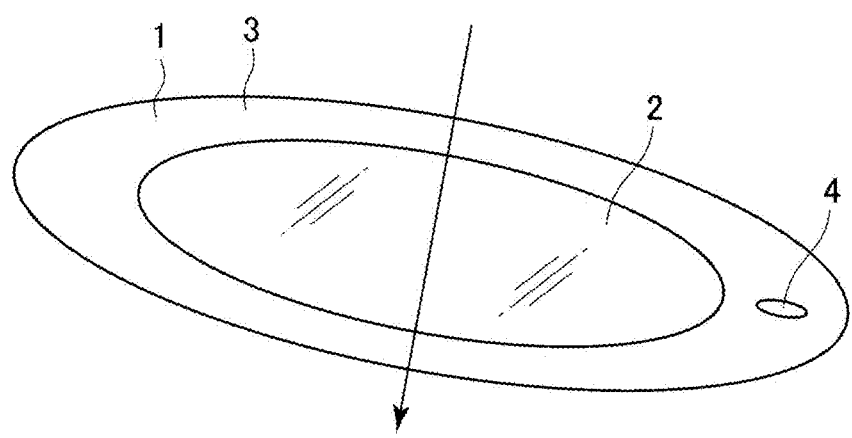

FIGS. 1A and 1B are views of the external appearance of a display device 1 according to a first embodiment of the present disclosure. Specifically, FIG. 1A depicts the display device 1 viewed from the front side of the display device 1. FIG. 1B depicts the display device 1 viewed from the back side of the display device 1. As depicted in FIGS. 1A and 1B, the display device 1 has a circular shape and includes a display 2 at the center of the display device 1. The display 2 has a circular shape. A housing 3 has a donut shape and is provided around the display 2. The housing 3 includes an imager 4 (built-in camera) on the back surface of the housing 3. As described in detail later, an external camera (including a camera coupled to a telephoto lens, a telescope, or the like) provided separately from the display device 1 may be used as the imager 4. In this case, communication may be performed between the display device 1 and the external camera. When the user uses the display device 1, the user views the display 2 by holding the housing 3 by a hand.

Figure 2:
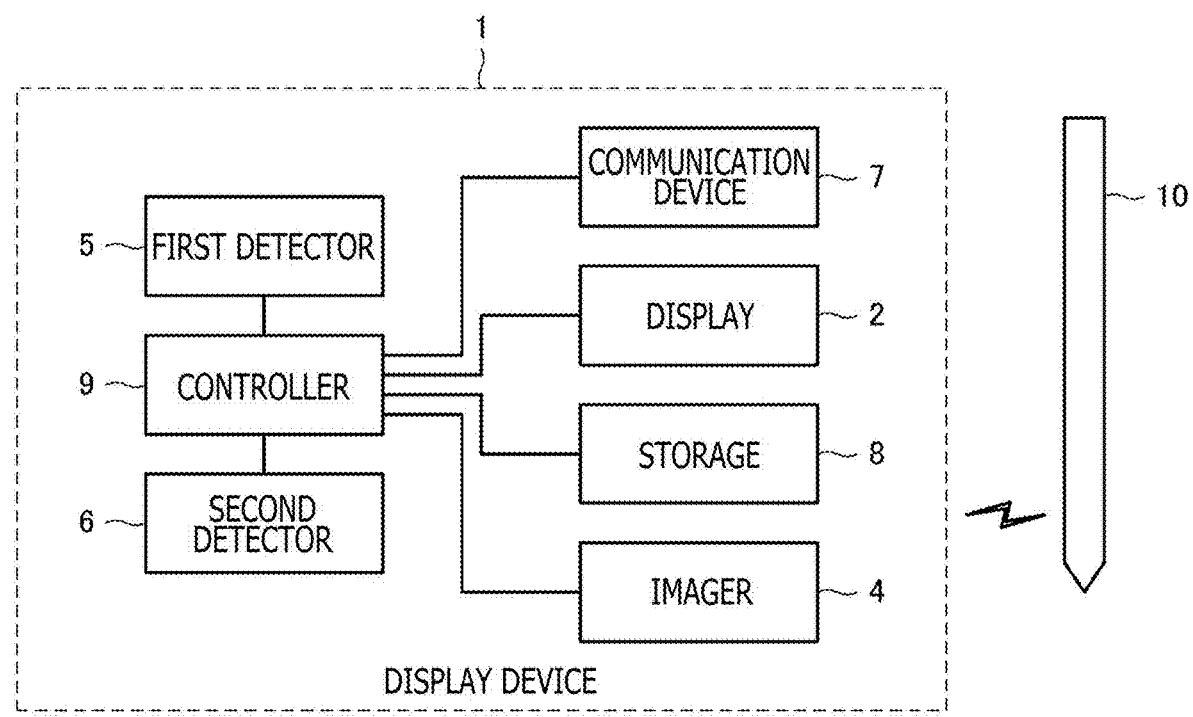
FIG. 2 is a schematic block diagram depicting functional blocks of the display device depicted in FIGS. 1A and 1B.

FIG. 2 is a schematic block diagram depicting functional blocks of the display device 1. As depicted in the FIG. 2, the display device 1 functionally includes a first detector 5, a second detector 6, a communication device 7, a storage 8, and a controller 9, in addition to the display 2 and the imager 4 depicted in FIGS. 1A and 1B. The display device 1 can be used together with an electronic pen 10. The electronic pen 10 acts as an indicator.

The display 2 is a transparent liquid crystal display (LCD) panel. The transmittance of the display 2 can be changed according to the value of the voltage applied from the controller 9. To change the transmittance, for example, a liquid crystal film (electronic shutter) is attached on the back surface of the transparent LCD panel so that the orientation direction is changed according to the value of the voltage applied from the controller 9. When the transmittance of the display 2 is greater than 0%, the user views, through the display 2, an object in the real world that exists on the other side of the display device 1. Therefore, when a virtual image is displayed on the display 2, the virtual image displayed on the display 2 is superimposed on the object in the real world, allowing the user to view the object in the real world and the virtual image superimposed on each other on the display 2. In this manner, augmented reality (AR) (an AR1 mode described later) is realized.

The imager 4 is a camera built in the display device 1 and is capable of outputting a captured video to the controller 9 in real time. The controller 9 outputs the video input from the imager 4 to the display 2 in real time. When the video output from the imager 4 is being displayed on the display 2, the user views the video of an object in the real world captured by the imager 4. Therefore, when a virtual image is superimposed on the video output from the imager 4 and displayed, the user views the object in the real world and the virtual image displayed on the display 2 that are superimposed on each other. In this manner as well, augmented reality (AR) (an AR2 mode described later) is realized.

The first detector 5 is a transparent sensor device or circuit arranged on the back surface of the display 2 and functions to detect a position indicated by the indicator on the display 2. While various methods such as an active electrostatic coupling method, a capacitance method, an electromagnetic induction method, and a pressure sensing method are available as a method of detecting a position indicated by the first detector 5, the active electrostatic coupling method is preferable for the display device 1. This is because the active electrostatic coupling method supports detection of both a touch by the electronic pen 10 and a touch by a finger. The following description will be given on the premise that the display device 1 employs the active electrostatic coupling method.

For example, the first detector 5 includes a plurality of first linear conductors (not depicted) and a plurality of second linear conductors (not depicted). Each of the plurality of first linear conductors extends in the X direction. Each of the plurality of second linear conductors extends in the Y direction perpendicular to the X direction on the panel plane. The first detector 5 detects a position indicated by the electronic pen 10 or the finger using the plurality of first and second linear conductors.

First, description will be given with regard to a case where the first detector 5 detects a position indicated by the electronic pen 10. The electronic pen 10 employing the active electrostatic coupling method has a function of transmitting position detection signals to the display device 1. The first detector 5 detects a position detection signal in each of the plurality of first and second linear conductors and determines the strength of the position detection signal received by each of the first and second linear conductors. Greater strength of the received position detection signal indicates that the distance between the linear conductor and the electronic pen 10 is small. From the strength of the received position detection signals, therefore, the first detector 5 can detect a position indicated by the electronic pen 10. The first detector 5 outputs the detected position to the controller 9 as coordinate data including two-dimensional X and Y coordinate values.

Next, a description will be given with regard to a case where the first detector 5 detects a position indicated by the finger. The first detector 5 sequentially supplies a signal to each of the plurality of first linear conductors and sequentially causes each of the plurality of second linear conductors to receive the signal. The first detector 5 determines the strength of the received signal for each of combinations of the first and second linear conductors. Specifically, when the finger approaches the intersection of one of the combinations of the first and second linear conductors, part of the current flowing from the first linear conductor to the second linear conductor is absorbed by the human body. This, as a result, reduces the strength of the signal received by the second linear conductor. By determining the strength of the received signals as described above, therefore, the first detector 5 can determine the intersection at which the finger is approaching, that is, the position indicated by the finger. As in the case of the electronic pen 10, the first detector 5 outputs the detected position to the controller 9 as coordinate data including two-dimensional X and Y coordinate values.

The electronic pen 10 is capable of transmitting various types of information such as writing pressure information, side switch information, and a unique identifier (ID), in addition to the position detection signals. The writing pressure information indicates pressure (writing pressure value) applied to the pen tip. The side switch information indicates on or off of a side switch provided on the side surface of the electronic pen 10. The unique ID is stored in the electronic pen 10 in advance. When the first detector 5 receives these pieces of information from the electronic pen 10, the first detector 5 combines these pieces of information with the coordinate data indicating the position indicated by the electronic pen 10 and transmits the combined information to the controller 9 as one piece of information.

The second detector 6 is a functional device or circuit that detects position information (for example, the latitude and longitude) and orientation of the display device 1. Among the functions of the second detector 6, the function of detecting the position information is implemented using a GPS receiver, for example. The function of detecting the orientation is implemented using, for example, a sensor capable of detecting the acceleration, magnetism, angular velocity, and the like. The second detector 6 transmits the detected position information and orientation to the controller 9.

The communication device 7 is a communication device that performs data communication with the electronic pen 10 and an arbitrary information terminal (not depicted). It is noted that the communication performed by the communication device 7 is different from the communication performed between the electronic pen 10 and the first detector 5. The communication device 7 may communicate with the electronic pen 10 or the arbitrary information terminal by wireless communication or may communicate with the electronic pen 10 or the arbitrary information terminal by wired communication. In one example, communication between the communication device 7 and the electronic pen 10 is performed using Bluetooth (registered trademark), while communication between the communication device 7 and the information terminal is performed by a wireless local area network (LAN).

The storage 8 is a functional device that stores a computer program and data. The storage 8 is, for example, implemented by a storage device such as a dynamic random access memory (DRAM), a flash memory, or a hard disk or implemented by a combination of these storage devices.

The controller 9 is a processor that executes each operation of the display device 1 described in the present embodiment by reading and executing the program stored in the storage 8. The controller 9 is coupled to each component depicted in FIG. 2 through a bus (not depicted) or the like.

Operations performed by the controller 9 include an operation of causing the display 2 to display a virtual image corresponding to the position information and orientation detected by the second detector 6 and changing a display mode of the virtual image according to the indicated position detected by the first detector 5. Specifically, the controller 9 performs this operation by switching its mode to one of three modes, i. e., in the AR1 mode, the AR2 mode, and a non-AR mode.

The AR1 mode realizes augmented reality by displaying a virtual image superimposed on an object in the real world viewed through the transparent display 2. The controller 9 in this mode sets the transmittance of the display 2 to a first value. The first value is greater than 0%. For example, the first value is the maximum value (preferably 100%) of the transmittance. Subsequently, the controller 9 forms a virtual image corresponding to the position information and orientation detected by the second detector 6, and outputs the virtual image to the display 2.

Figure 3A:
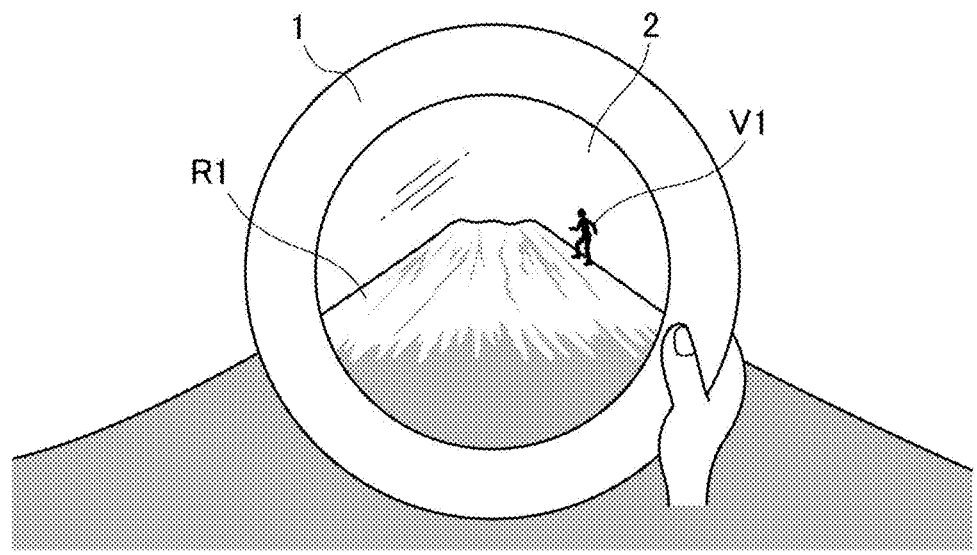
FIG. 3A is a diagram depicting a display example in an AR1 mode.

FIG. 3A is a diagram depicting a display example in the AR1 mode. In the example in FIG. 3A, a real object Mt. Fuji R1 exists on the other side of the display 2 and the display device 1 is held by the user. In this example, while the controller 9 is in the AR1 mode, the display 2 is transparent except the area in which a human image V1, which is a virtual image, is displayed. Therefore, the user is able to view, through the display 2, the Mt. Fuji R1 that exists on the other side of the display device 1. As a result, the human image V1 appears to be superimposed on the Mt. Fuji R1, allowing the user to experience the augmented reality.

The AR2 mode realizes augmented reality by displaying a virtual image superimposed on a video output from the imager 4. The controller 9 in this mode sets the transmittance of the display 2 to a third value smaller than the first value and causes the imager 4 to start capturing a video. The third value is, for example, the minimum value (preferably 0%) of the transmittance. Then, the controller 9 sequentially outputs the video supplied in real time from the imager 4 to the display 2, while forming a virtual image corresponding to the position information and orientation detected by the second detector 6 and outputting the virtual image to the display 2. As a result, a real object displayed through the imager 4 and the virtual image are superimposed on each other and displayed on the display 2. The real object and the virtual image are displayed similarly to the AR1 mode depicted in FIG. 3A, allowing the user to experience the augmented reality.

The non-AR mode causes the display 2 to display a virtual image only. The controller 9 in this mode sets the transmittance of the display 2 to a second value smaller than the first value. For example, the second value is the minimum value (preferably 0%) of the transmittance. Subsequently, the controller 9 forms a virtual image corresponding to the position information and orientation detected by the second detector 6 and outputs the virtual image to the display 2.

Figure 3B:
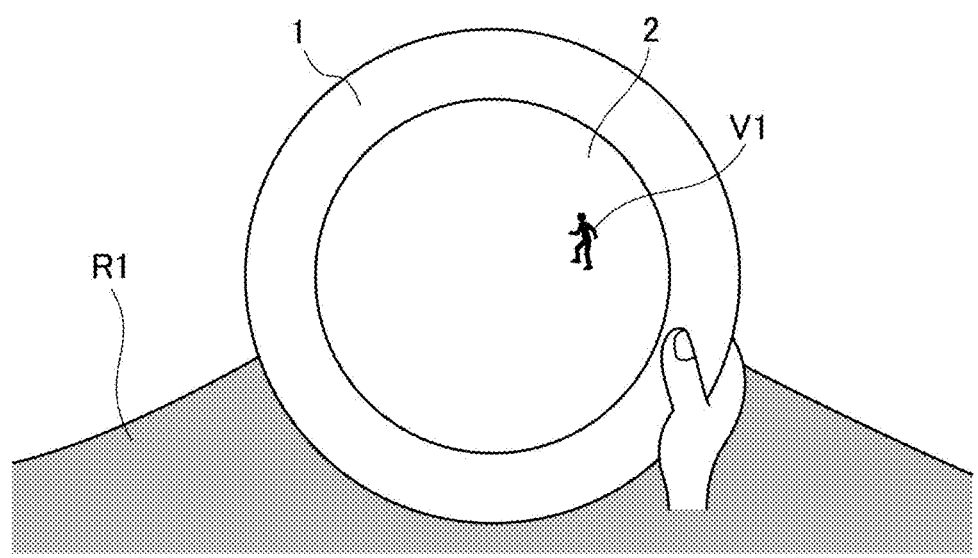
FIG. 3B is a diagram depicting a display example in a non-AR mode.

FIG. 3B is a diagram depicting a display example in the non-AR mode. In the example in FIG. 3B, the controller 9 has been switched to the non-AR mode during the state in FIG. 3A. Entering the non-AR mode makes the display 2 opaque, disabling the user to view, at least on the display 2, the Mt. Fuji R1 that exists on the other side of the display 2. As a result, the user views the human image V1, which is a virtual image.

Additionally, the operations performed by the controller 9 also include an operation of generating stroke data on the basis of a series of indicated positions detected by the first detector 5 and storing the stroke data in the storage 8 while displaying the stroke data on the display 2.

How the controller 9 changes the display mode of the virtual image will be specifically described below, using an example in which the display device 1 is used for astronomical observation.

Figure 4B:
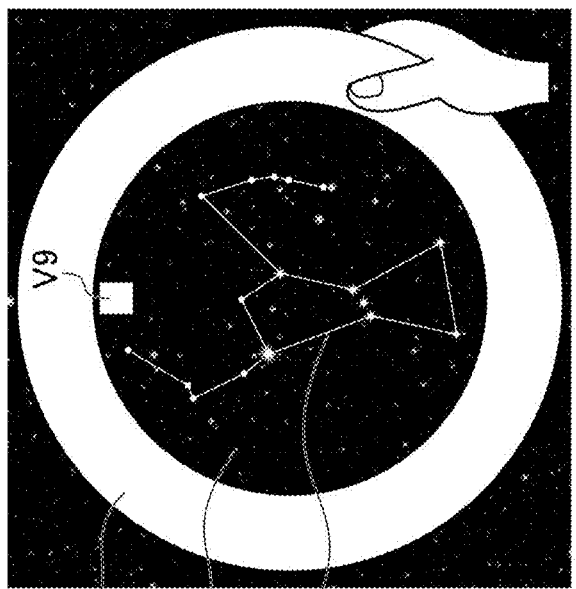
FIGS. 4A to 4C are diagrams depicting an example of switching between the AR1 mode, an AR2 mode, and the non-AR mode.
Figure 4C:
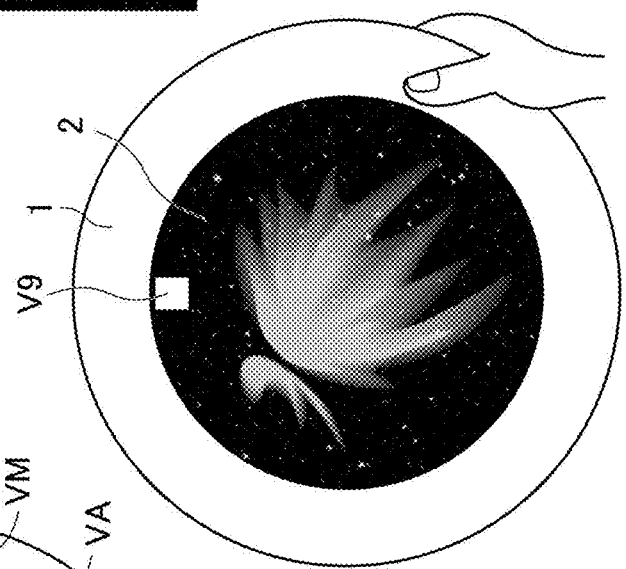
Figure 4A:
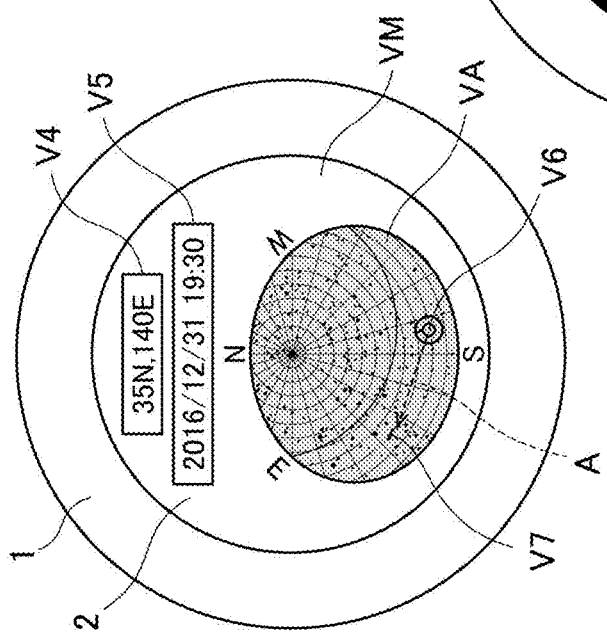

FIGS. 4A to 4C are diagrams depicting an example of switching between the AR1 mode, the AR2 mode, and the non-AR mode. Specifically, FIG. 4A depicts a state (non-AR mode) in which a planisphere is displayed on the display 2. FIG. 4B depicts a state (AR1 mode) in which astronomical objects in the real starry sky are visible through the display 2. FIG. 4C depicts a state (AR2 mode) in which an image of the astronomical objects captured by the imager 4 is displayed on the display 2.

By referring to FIG. 4A, the controller 9 has a function of displaying, on the display 2, the planisphere (virtual image) widely used for astronomical observation. When the planisphere is displayed, the controller 9 is in the non-AR mode and displays the virtual image on the display 2.

Here, the structure of a planisphere will be briefly described. The planisphere includes a mask arranged on a star chart. The mask has an elliptical opening to display astronomical objects above the horizon in the real starry sky.

The planisphere displayed on the display 2 in the example in FIG. 4A has basically a similar structure to the structure of the planisphere described above and includes an astronomical object displaying area VA and a mask area VM. The astronomical object displaying area VA corresponds to the opening of the mask. The mask area VM corresponds to the mask (area other than the opening).

The controller 9 enters the non-AR mode to display the planisphere. Then, the controller 9 obtains the current date and time from a built-in calendar and a built-in clock, not depicted, while obtaining the current latitude and longitude from the position information detected by the second detector 6. The controller 9 displays, in the astronomical object displaying area VA, an all-sky image corresponding to the obtained current date and time and the obtained current latitude and longitude, together with additional information such as right ascension and declination. Accordingly, the user can view the entire starry sky in the current position and the current date and time in the astronomical object displaying area VA. The mask area VM includes a latitude and longitude displaying section V4 and a date and time displaying section V5. The controller 9 displays the obtained current date and time in the date and time displaying section V5 while displaying the obtained current latitude and longitude in the latitude and longitude displaying section V4.

The controller 9 displays a mark V6 in the astronomical object displaying area VA. The mark V6 indicates the orientation detected by the second detector 6. The mark V6 is a double-circle image, for example. The controller 9 adjusts the display position of the mark V6 such that the center of the double circle matches the orientation detected by the second detector 6. Displaying the mark V6 allows the user to broadly understand which part of the starry sky the user is oriented to.

The user can easily find a constellation in the real starry sky by using the planisphere depicted in FIG. 4A. For example, when the user wants to observe the Orion constellation, the user changes the orientation of the display device 1 such that the mark V6 approaches an Orion constellation image V7 in the astronomical object displaying area VA (this movement is indicated by an arrow A). The display device 1 turned in this manner is oriented in the direction of the Orion constellation in the real starry sky. Thus, the real Orion constellation appears in front of the user when the user puts the display device 1 out of view.

When the user touches an arbitrary position in the astronomical object displaying area VA while the planisphere is displayed on the display 2, the controller 9 changes the display state of the display 2 by changing its mode in response to this touch. The controller 9 switches its mode to the AR1 mode or the AR2 mode depending on the touch operation performed by the user. Description will be given for each of the AR1 mode and the AR2 mode.

When the touch operation is a so-called single-tap operation, for example, the controller 9 enters the AR1 mode and sets the transmittance of the display 2 to the first value by controlling the voltage applied to the display 2. In addition, the controller 9 deletes the planisphere from the display 2 and instead displays, on the display 2, information on stars that have been displayed in the vicinity of the mark V6 in the astronomical object displaying area VA. The information on stars includes, for example, the shape of a constellation and the name of an astronomical object and is displayed on the display 2 as a virtual image. Accordingly, the user can check, for example, the shape of the constellation in the real starry sky.

FIG. 4B depicts a case where the mark V6 has been located in the vicinity of the Orion constellation image V7 in the astronomical object displaying area VA when the user touches an arbitrary position in the astronomical object displaying area VA depicted in FIG. 4A. That is, FIG. 4B depicts a case where the display device 1 has been oriented in the direction of the Orion constellation. In this case, the user views the real Orion constellation through the display 2 that has been turned transparent. As depicted in FIG. 4B, the controller 9 also displays a constellation image V8 on the display 2. The constellation image V8 represents a constellation within a predetermined range centered on the Orion constellation. As a result, the constellation image V8 superimposed on the real starry sky is displayed on the display 2. In addition to the constellation image V8 depicted in FIG. 4B, virtual images displayed in this manner may also include the names (including Messier and new general catalogue (NGC)) of stars, star clusters, nebulae, planets, and comets or the like, and artificial satellites the equator (including the right ascension and declination), and the ecliptic or the like.

When the touch operation is a so-called double-tap operation, for example, the controller 9 enters the AR2 mode and sets the transmittance of the display 2 to the third value by controlling the voltage applied to the display 2. In addition, the controller 9 deletes the planisphere from the display 2 while activating the imager 4. The controller 9 sequentially outputs a video supplied in real time from the imager 4 to the display 2, and the video output from the imager 4 is displayed on the display 2. At the same time, virtual images similar to the virtual images displayed in the AR1 mode may also be displayed on the display 2. As in the case of the AR1 mode, the user can check, for example, the shape of a constellation in the real starry sky.

FIG. 4C depicts a case where the user has touched the Great Orion Nebula (a nebula in the vicinity of the center of the Orion constellation image V7) in the astronomical object displaying area VA. The controller 9 displays a video output from the imager 4 on the display 2. This allows the user to view, on the display 2, even an astronomical object that is otherwise difficult to be viewed with the naked eyes (that is, difficult to be viewed in the display state in FIG. 4B).

In both of the display depicted in FIG. 4B and the display depicted in FIG. 4C, the controller 9 displays, as one of the virtual images, a return button V9 to return to the planisphere. When the user touches the return button V9, the controller 9 returns its mode to the non-AR mode and displays the planisphere depicted in FIG. 4A on the display 2 again. Accordingly, the user can check the planisphere again.

When the user touches an area other than the return button V9 during the display depicted in FIG. 4B, the controller 9 sets its mode to the AR2 mode to switch to the display depicted in FIG. 4C. In this case, the area displayed on the entire display 2 preferably corresponds to the position touched by the user so that the user can view the video of astronomical objects at the touched position. When the user touches an area other than the return button V9 during the display depicted in FIG. 4C, the controller 9 sets its mode to the AR1 mode to switch to the display depicted in FIG. 4B. Accordingly, the user can view astronomical objects in a wider range.

The controller 9 may change the display state of the display 2 by a trigger other than a touch. For example, when the mark V6 has come closer to a predetermined constellation (for example, the Orion constellation image V7) during the display of the planisphere, the display state may be switched to the display depicted in FIG. 4B. Further, when the orientation of the display 2 has been away from the constellation (for example, the Orion constellation image V7) being displayed during the display depicted in FIG. 4B, the display state may be switched to the display of the planisphere.

The operation of the controller 9 will be described in more detail with reference to a flowchart of the controller 9. As an example, the display device 1 is used for astronomical observation (see FIGS. 4A to 4C).

FIGS. 5 to 8 are flowcharts of the operation of the controller 9. As depicted in FIG. 5, the controller 9 starts operation in the non-AR mode (S1).

Figure 6:
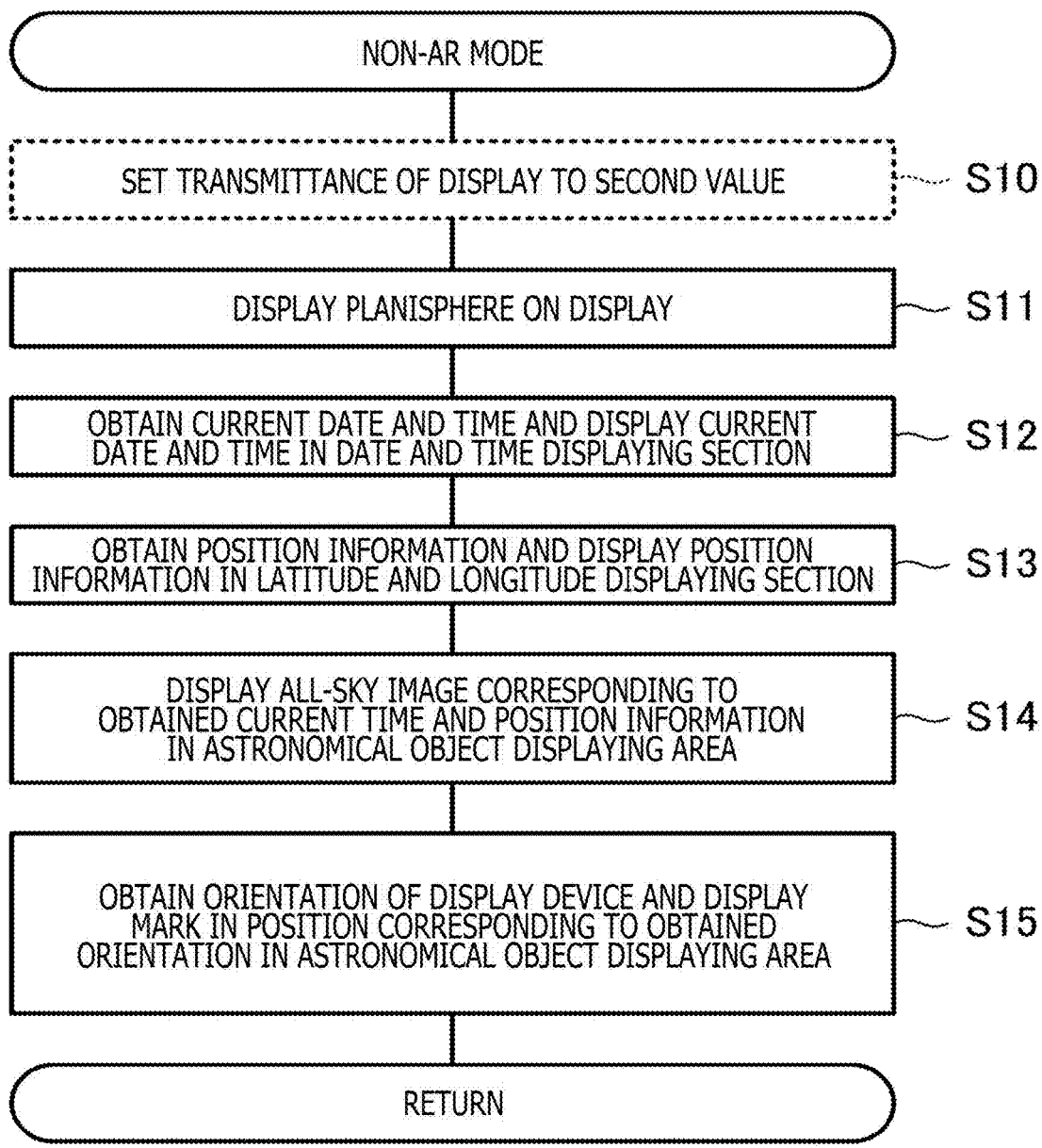
FIG. 6 is a flowchart of the operation of the controller, which is depicted in FIG. 2, in the non-AR mode.

FIG. 6 is a flowchart of the operation of the controller 9 in the non-AR mode. As depicted in the FIG. 6, the controller 9 in the non-AR mode sets the transmittance of the display 2 to the second value (S10). In FIG. 6, the operation at S10 is circled with a broken line. This is because the operation at S10 is not performed when the transmittance of the display 2 has already been set to the second value.

Next, the controller 9 displays the planisphere depicted in FIG. 4A on the display 2 (S11). Subsequently, the controller 9 obtains the current date and time from the built-in clock, not depicted, and displays the current date and time in the date and time displaying section V5 depicted in FIG. 4A (S12). The controller 9 also obtains position information of the display device 1 from the second detector 6 and displays the position information in the latitude and longitude displaying section V4 depicted in FIG. 4A (S13). Further, the controller 9 obtains an all-sky image (virtual image) corresponding to the obtained current time and position information and displays the all-sky image in the astronomical object displaying area VA depicted in FIG. 4A (S14). The controller 9 also obtains the orientation of the display device 1 from the second detector 6 and displays the mark V6 depicted in FIG. 4A in a position corresponding to the obtained orientation in the astronomical object displaying area VA (S15).

Referring back to FIG. 5, the controller 9 that has performed the operation at S1 determines whether the user has touched the astronomical object displaying area VA by referring to the data output from the first detector 5 (S2). When the controller 9 determines that the user has not touched the astronomical object displaying area VA, the controller 9 repeats the operation at S1. When the controller 9 determines that the user has touched the astronomical object displaying area VA, the controller 9 determines what touch operation has been performed by further referring to the data output from the first detector 5 (S3). When the controller 9 determines that the touch operation has been a first operation (for example, a single tap), the controller 9 starts the operation in the AR1 mode (S4). When the controller 9 determines that the touch operation has been a second operation (for example, a double tap), the controller 9 starts the operation in the AR2 mode (S7).

Figure 7:
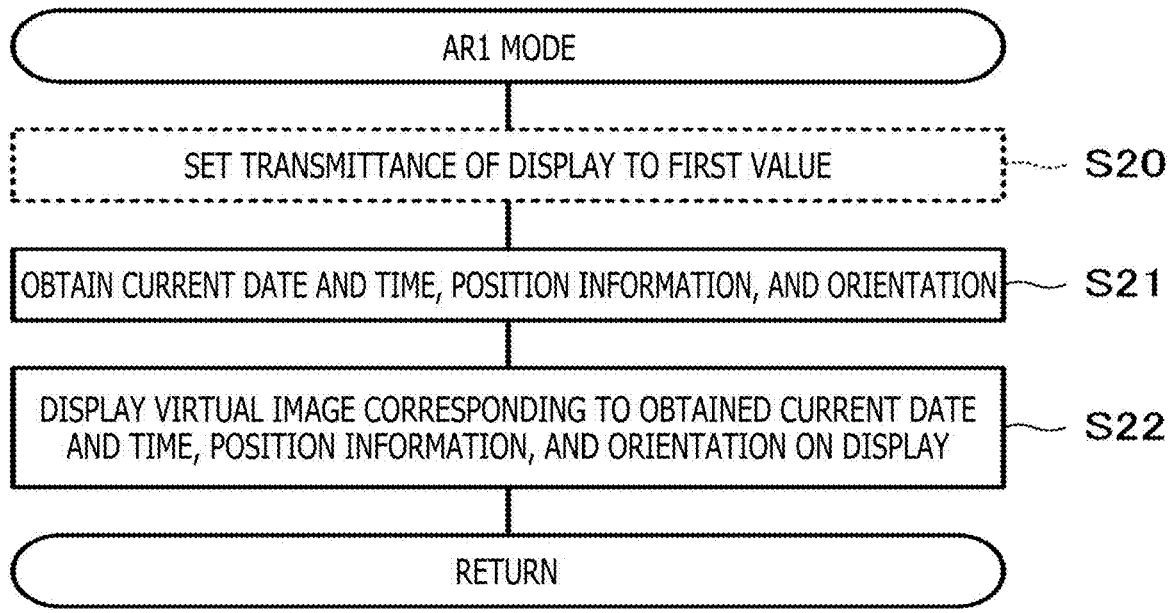
FIG. 7 is a flowchart of the operation of the controller, which is depicted in FIG. 2, in the AR1 mode.

FIG. 7 is a flowchart of the operation of the controller 9 in the AR1 mode (S4). As depicted in the FIG. 7, the controller 9 that has entered the AR1 mode sets the transmittance of the display 2 to the first value (S20). At this point, the planisphere displayed in the non-AR mode is deleted. In FIG. 7, the operation at S20 is circled with a broken line. This is because the operation at S20 is not performed when the transmittance of the display 2 has already been set to the first value.

Next, the controller 9 obtains the current date and time, position information, and orientation, as in the case of the non-AR mode (S21). The controller 9 displays a virtual image corresponding to the obtained current date and time, position information, and orientation on the display 2 (S22).

Figure 8:
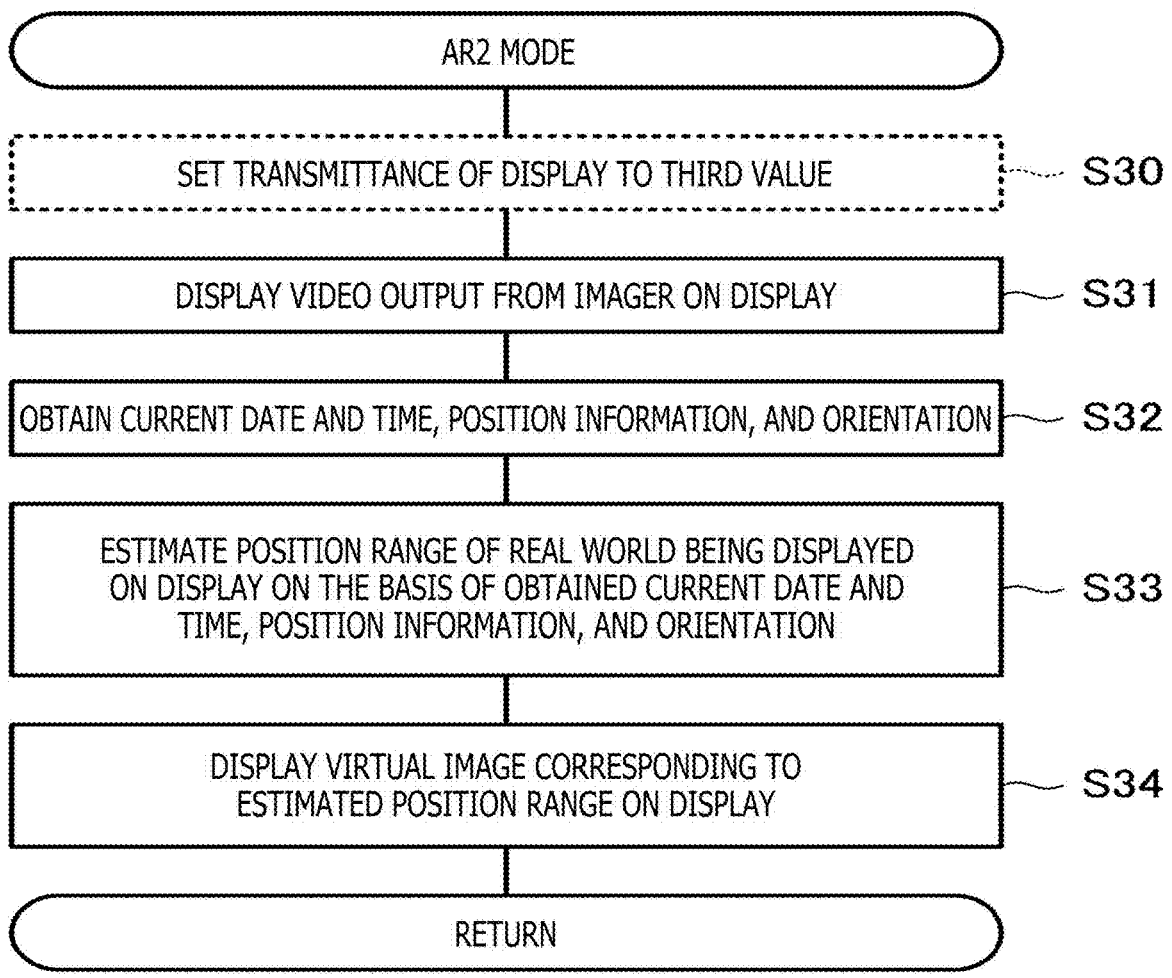
FIG. 8 is a flowchart of the operation of the controller, which is depicted in FIG. 2, in the AR2 mode.

FIG. 8 is a flowchart of the operation of the controller 9 in the AR2 mode (S7). As depicted in the FIG. 8, the controller 9 that has entered the AR2 mode sets the transmittance of the display 2 to the third value (S30). In FIG. 8, the operation at S30 is circled with a broken line. This is because the operation at S30 is not performed when the transmittance of the display 2 has already been set to the third value.

Next, the controller 9 displays a video output from the imager 4 on the display 2 on the basis of the position touched by the user (S31). At this point, the planisphere displayed in the non-AR mode is deleted.

Subsequently, the controller 9 obtains the current date and time, position information, and orientation, as in the case of the non-AR mode (S32). On the basis of the obtained current date and time, position information, and orientation, the controller 9 estimates the position range of the real world being displayed on the display 2 (S33). Then, the controller 9 displays, on the display 2, a virtual image corresponding to the estimated position range (S34). Accordingly, the virtual image corresponding to the astronomical objects actually being displayed on the display 2 can be displayed.

Referring back to FIG. 5, the controller 9 that has performed the operation at S4 determines whether the user has touched the display 2 by referring to the data output from the first detector 5 (S5). When the controller 9 determines that the user has not touched the display 2, the controller 9 repeats the operation at S4. When the controller 9 determines that the user has touched the display 2, the controller 9 determines the touched area by further referring to the data output from the first detector 5 (S6). When the controller 9 determines that the touched area is within a predetermined area (for example, the return button V9 depicted in FIG. 4B), the controller 9 starts the operation in the non-AR mode (S1). When the controller 9 determines that the touched area is the other area, the controller 9 starts the operation in the AR2 mode (S7).

The controller 9 that has performed the operation at S7 determines whether the user has touched the display 2 by referring to the data output from the first detector 5 (S8). When the controller 9 determines that the user has not touched the display 2, the controller 9 repeats the operation at S7. When the controller 9 determines that the user has touched the display 2, the controller 9 determines the touched area by further referring to the data output from the first detector 5 (S9). When the controller 9 determines that the touched area is within a predetermined area (for example, the return button V9 depicted in FIG. 4C), the controller 9 starts the operation in the non-AR mode (S1). When the controller 9 determines that the touched area is the other area, the controller 9 starts the operation in the AR1 mode (S4).

As described above, the display device 1 according to the present embodiment is capable of effectively changing the display mode of the virtual image representing the augmented reality on the display 2 according to the touch operation performed by the user.

It is noted that the imager 4 may be attached to an equatorial mount and the display device 1 may be used as a controller for this equatorial mount. The details will be described below with reference to FIGS. 9 and 10.

Figure 9:
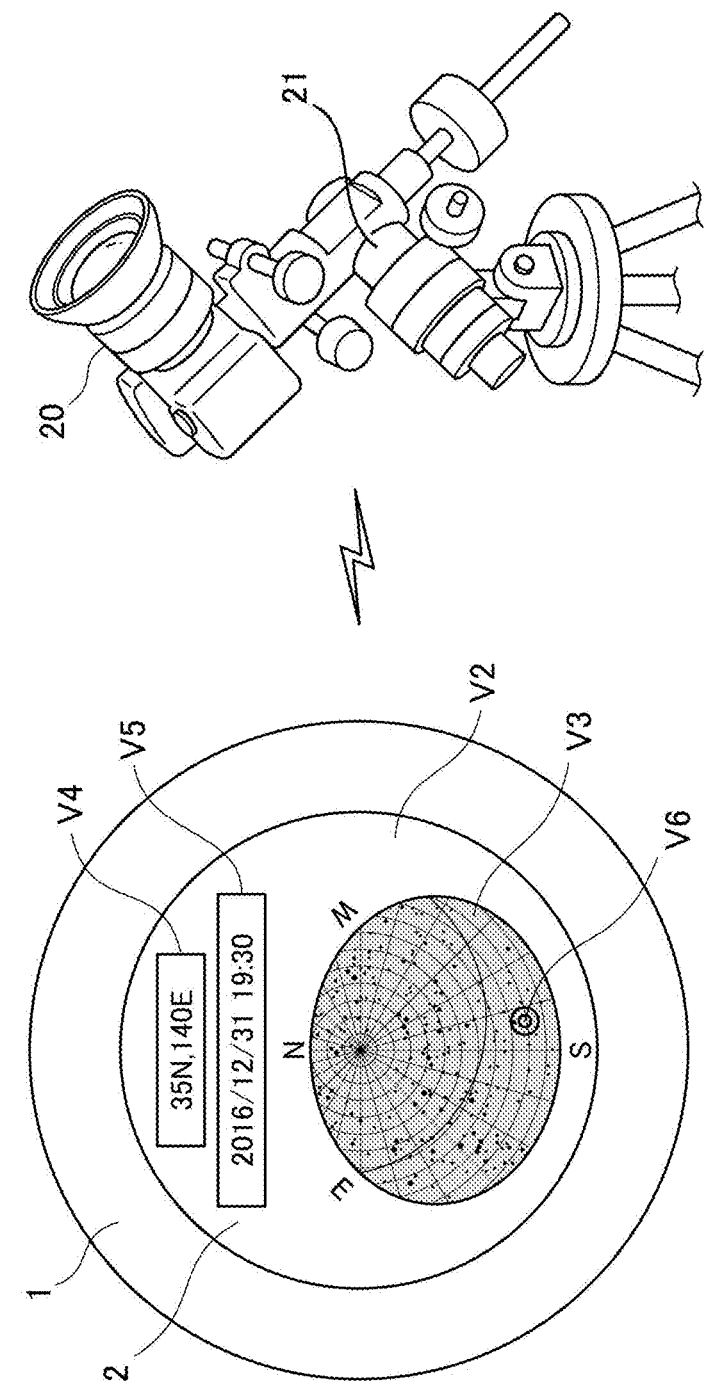
FIG. 9 is a diagram depicting the display device and an equatorial mount equipped with a camera.

FIG. 9 is a diagram depicting the display device 1 and an equatorial mount 21 equipped with a camera 20. The camera 20 acts as the imager 4. Each of the camera 20 and the equatorial mount 21 is capable of communicating with the controller 9 by wireless communication through the communication device 7. A telephoto lens is preferably attached to the camera 20 to allow the user to observe an astronomical object at a magnification as depicted in FIG. 4C. An image of an astronomical object captured by the camera 20 may be displayed in real time on the display device 1. Alternatively, an image captured and stored in advance may be displayed. Still alternatively, an image may be captured within predetermined exposure time and the captured image may be displayed.

As a preparation, the user aligns the polar axis of the equatorial mount 21. Next, the controller 9 displays the planisphere depicted in FIG. 4A on the display 2 of the display device 1. When the user touches an arbitrary position in the astronomical object displaying area VA, the controller 9 enables an automatic tracking function of the equatorial mount 21 to keep the camera 20 oriented in the direction of an astronomical object (hereinafter referred to as "tracking target astronomical object") corresponding to the position touched by the user. The controller 9 also sets its mode to the AR2 mode. In the AR2 mode, a video captured by the camera 20 is displayed on the display 2. With this configuration, even after time passes, the tracking target astronomical object continues to be displayed on the display 2. Accordingly, the user can view, on the display 2, the tracking target astronomical object and the virtual image superimposed on the tracking target astronomical object.

A second embodiment of the present disclosure will now be described. In addition to the functions described in the first embodiment, the display device 1 according to the present embodiment has a function of cooperating with another display device 1, allowing the user to view, on the display 2, a video captured by another person's camera.

Figure 10:
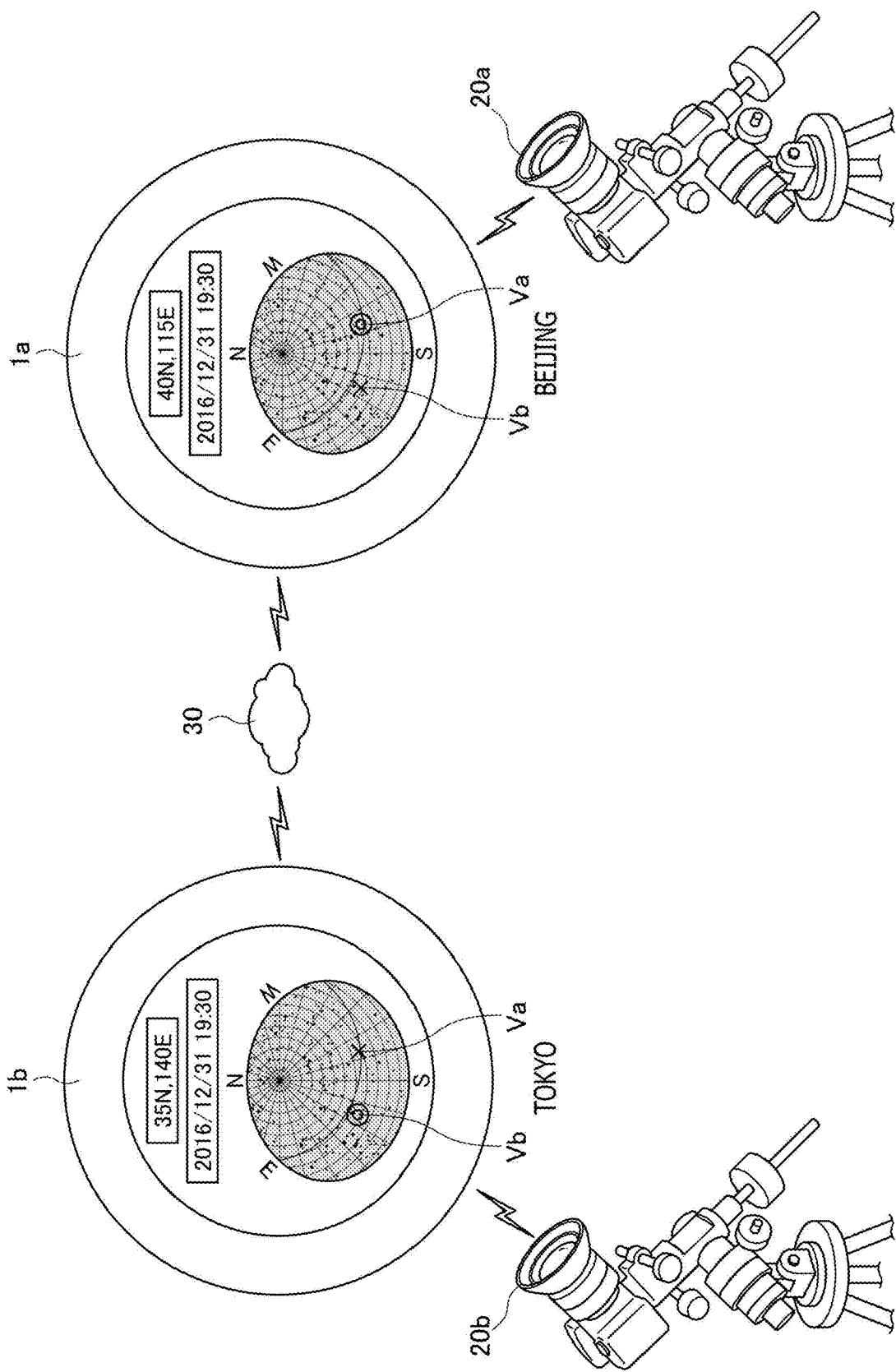
FIG. 10 is a diagram depicting how the display device according to a second embodiment of the present disclosure is used.

FIG. 10 is a diagram depicting how the display device 1 according to the present embodiment is used. Each of display devices 1a and 1b depicted in FIG. 10 represents the display device 1 according to the present embodiment. The display device 1a is used to observe the starry sky in Beijing while the display device 1b is used to observe the starry sky in Tokyo. In the example in FIG. 10, the display devices 1a and 1b are in the AR2 mode and display videos received from external cameras 20a and 20b, respectively (see FIG. 4C). A mark Va indicates the orientation of the display device 1a. A mark Vb indicates the orientation of the display device 1b.

The display devices 1a and 1b are capable of communicating with each other through a network 30. Specifically, each of the display devices 1a and 1b performs communication using the communication device 7 depicted in FIG. 2. Each display device 1 according to the present embodiment is assigned an identification number in advance to identify one another and stores the identification number in the storage 8 in advance. When the controller 9 of the display device 1b starts communication with the display device 1a, the controller 9 of the display device 1b transmits the identification number stored in the storage 8. The controller 9 of the display device 1a performs authentication using this identification number to determine whether communication can be performed with the display device 1b. When the controller 9 of the display device 1a determines that communication can be performed with the display device 1b, the controller 9 of the display device 1a starts communication with the display device 1b.

After communication starts with the display device 1b, the controller 9 of the display device 1a displays, on the display 2 of the display device 1a, not only the mark Va indicating the orientation of the display device 1a but also the mark Vb indicating the orientation of the display device 1b. The mark Va and the mark Vb are different from each other in appearances such as the shape and color. Similarly, the controller 9 of the display device 1b displays, on the display 2 of the display device 1b, not only the mark Vb indicating the orientation of the display device 1b but also the mark Va indicating the orientation of the display device 1a. When the mark Vb in the astronomical object displaying area VA is touched on the display device 1a, the controller 9 of the display device 1b distributes (for example, streams), to the display device 1a, a video obtained from the external camera 20b. Accordingly, the display device 1a displays the video that is captured by the camera 20b and that can be viewed on the display device 1b. Similarly, when the mark Va in the astronomical object displaying area VA is touched on the display device 1b, the controller 9 of the display device 1a distributes a video obtained from the external camera 20a to the display device 1b. Accordingly, the display device 1b displays the video that is captured by the camera 20a and that can be viewed on the display device 1a.

In the present embodiment, it is sufficient if the display device 1 that distributes a video is capable of obtaining the video from the camera 20 and distributing the video to other display devices 1. Therefore, the display device 1 may be another type of device. For example, instead of the display device 1, a distribution server may be provided to stream a video captured by the camera 20 to the display devices 1 around the world. This example is particularly effective for a large telescope such as the Hubble Space Telescope and astronomical telescopes installed at various astronomical observatories that have a large number of users who want to view the video from the large telescope. In this example, the distribution server distributes a video captured by a camera attached to the large telescope.

A third embodiment of the present disclosure will now be described. In addition to the functions described in the first embodiment, the display device 1 according to the present embodiment has a function of magnifying and displaying a virtual image on a screen or the like using light from an external light source (hereinafter referred to as "planetarium function").

Figure 11:
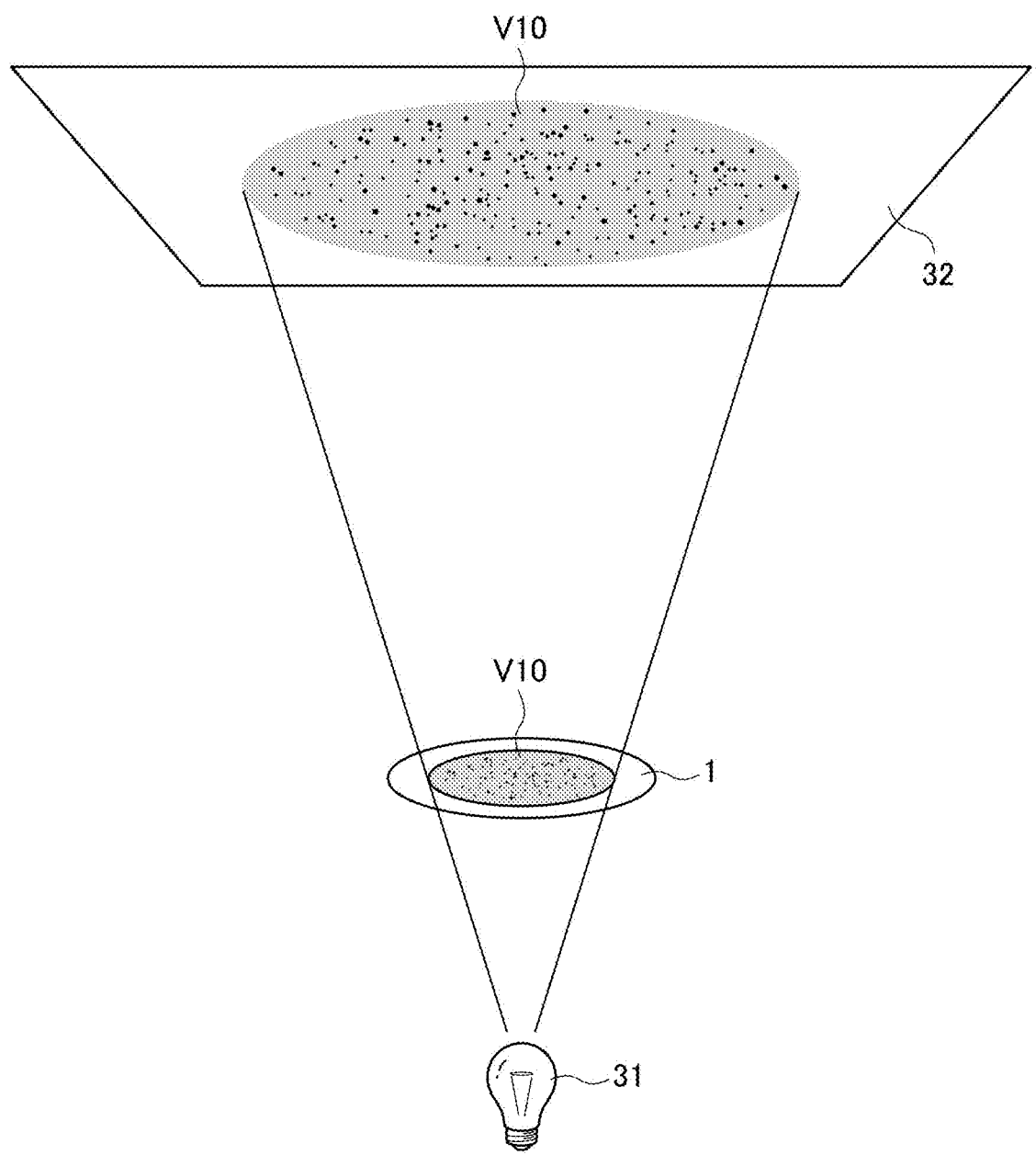
FIG. 11 is a diagram depicting how the display device according to a third embodiment of the present disclosure is used.

FIG. 11 is a diagram depicting how the display device 1 according to the present embodiment is used. When the controller 9 according to the present embodiment executes the planetarium function, the controller 9 enters the AR1 mode and displays, on the display 2, a virtual astronomical object image V10 to be projected. The virtual astronomical object image V10 is an image depicting the starry sky. More specifically, the virtual astronomical object image V10 is a negative image having an opaque portion and a transparent portion. The opaque portion is where an astronomical object exists. The portion other than the opaque portion is transparent.

When an external light source 31 irradiates one of the surfaces of the display device 1 with light while the controller 9 displays the virtual astronomical object image V10 on the display 2 as described above, the virtual astronomical object image V10 is projected on a screen 32 located on the opposite side of the light source 31 with the display device 1 interposed between the screen 32 and the light source 31. Accordingly, the user can enjoy the virtual astronomical object image V10 magnified and displayed on the screen 32. The screen 32 is preferably a wall of a room, for example.

A fourth embodiment of the present disclosure will now be described. In addition to the functions described in the first embodiment, the display device 1 according to the present embodiment has a function of acting like tracing paper.

Figure 12A:
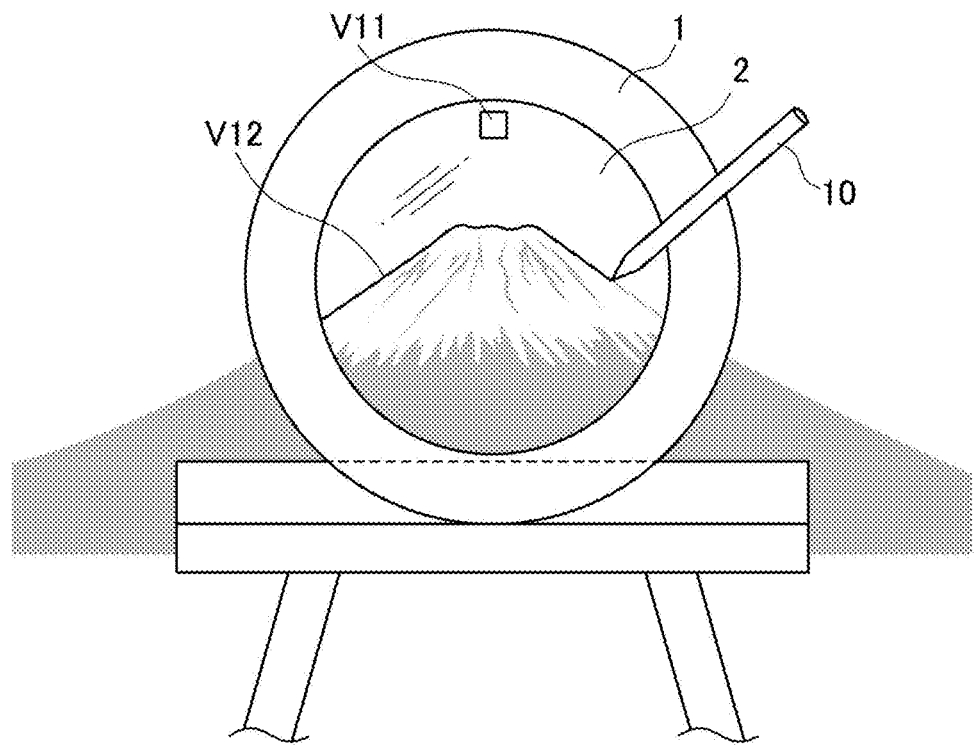
FIGS. 12A and 12B are diagrams depicting how the display device according to a fourth embodiment of the present disclosure is used.
Figure 12B:
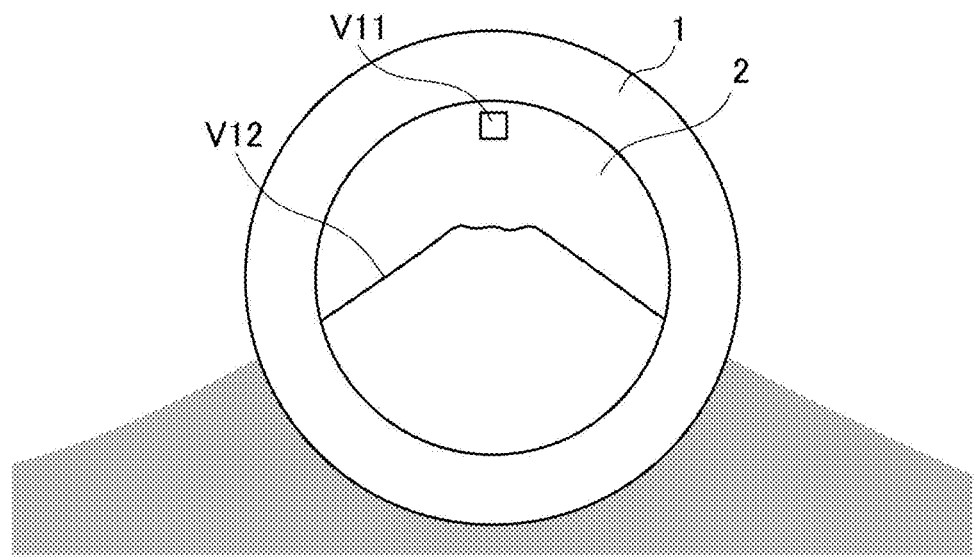

FIGS. 12A and 12B are diagrams depicting how the display device 1 according to the present embodiment is used. As depicted in FIG. 12A, when the display device 1 is used like tracing paper, the controller 9 sets its mode to the AR1 mode and sets the transmittance of the display 2 to the first value. The controller 9 also displays a switching button V11 (first image) on the display 2.

With the transmittance of the display 2 set to the first value, an object in the real world on the other side of the display device 1 (Mt. Fuji in FIG. 12A) is displayed on the display 2. The user inputs a line image V12 using the electronic pen 10 to trace the object in the real world. In this manner, the line image V12 is displayed on the display 2, and the user can trace the object in the real world.

When the user touches the switching button V11 (when the indicated position detected by the first detector 5 includes the position on the switching button V11), the controller 9 changes its mode to the non-AR mode and sets the transmittance of the display 2 to the second value. Accordingly, the user can check the line image V12 on the display 2, as depicted in FIG. 12B.

Figure 13A:
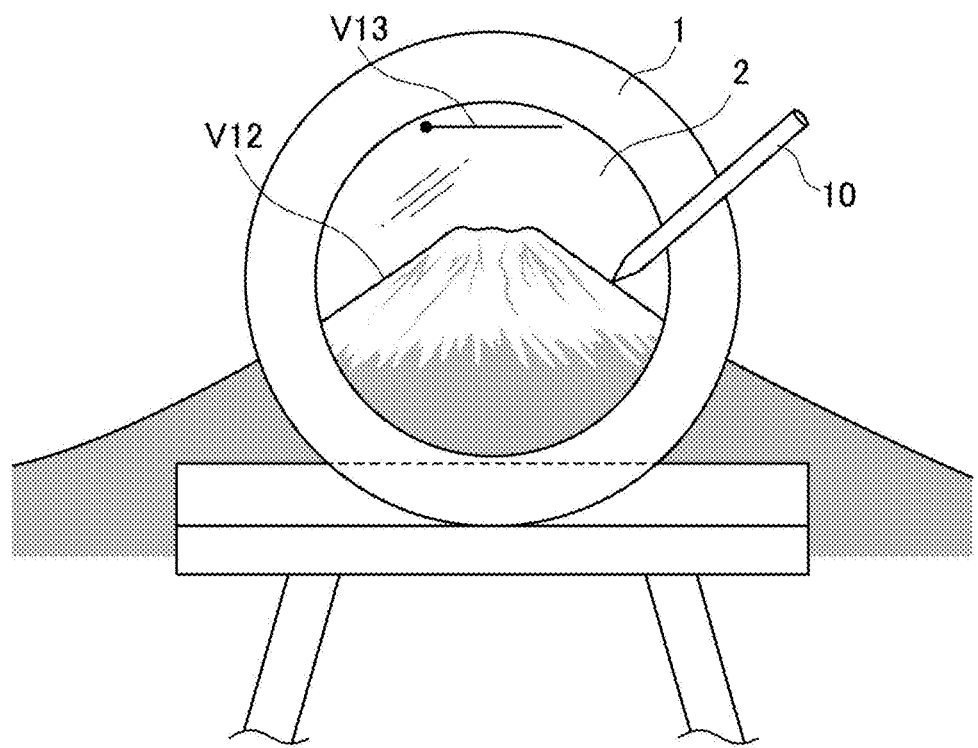
FIGS. 13A and 13B are diagrams depicting how the display device according to a modification of the fourth embodiment of the present disclosure is used.
Figure 13B:
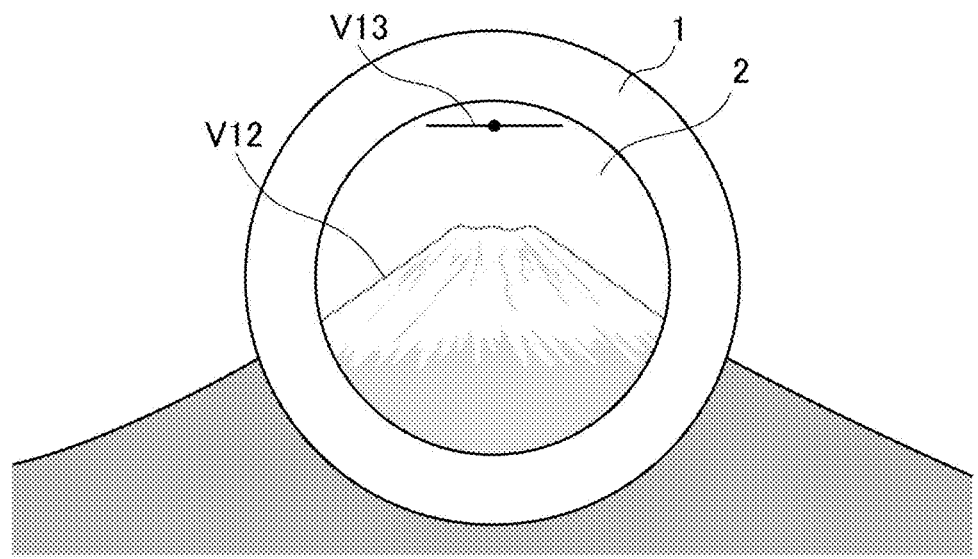

A slider may be used instead of the switching button V11. In the example depicted in FIGS. 13A and 13B, a slider V13 (second image) is displayed on the display 2, instead of the switching button V11. The controller 9 controls the transmittance of the display 2 on the basis of the indicated position detected by the first detector 5 on the slider V13. Specifically, for example, when the indicated position is at one end of the slider V13, the controller 9 sets the transmittance of the display 2 to the first value. When the indicated position is at the other end of the slider V13, the controller 9 sets the transmittance of the display 2 to the second value or the third value. When the indicated position is in the middle of the slider V13, the transmittance of the display 2 is set to an intermediate value between the first value and the second value or the third value. This example allows setting of the intermediate transmittance. By setting the transmittance to approximately an intermediate value, therefore, the line image V12 can relatively stand out, as depicted in FIG. 13B.

A fifth embodiment of the present disclosure will now be described. In addition to the functions described in the fourth embodiment, the display device 1 according to the present embodiment has a function of configuring a 3D image in the display device 1.

Figure 14:
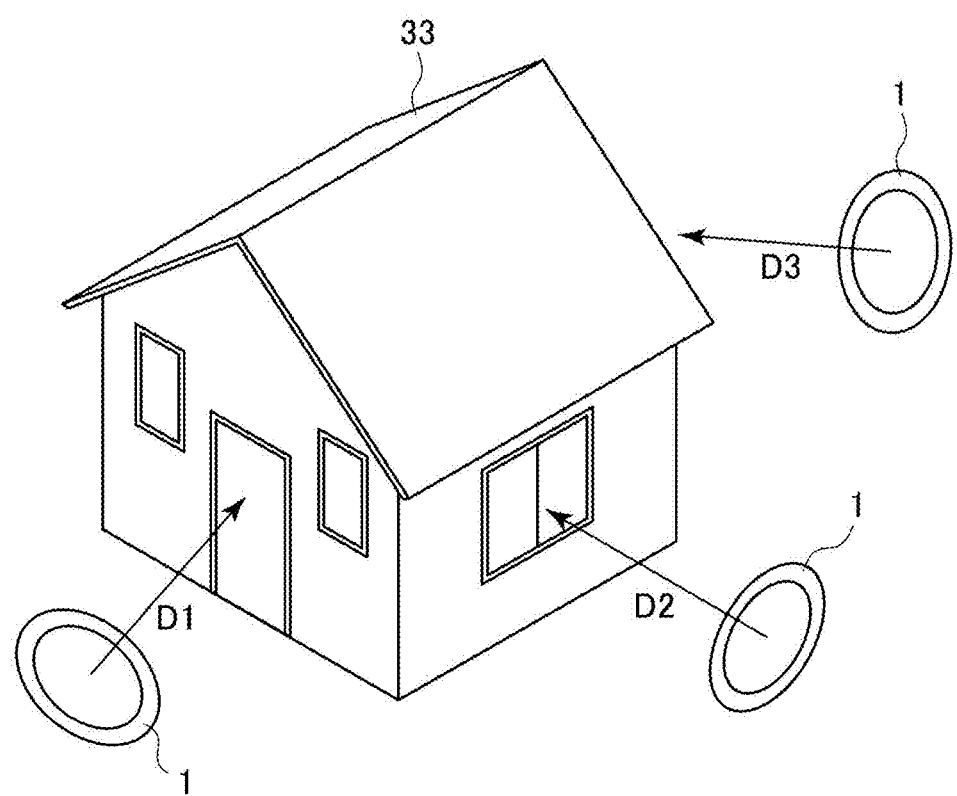
FIG. 14 is a diagram depicting how the display device according to a fifth embodiment of the present disclosure is used.

FIG. 14 is a diagram depicting how the display device 1 according to the present embodiment is used. In the example in FIG. 14, the user traces a building 33 from three directions D1 to D3 using the functions described in the fourth embodiment, and stores a virtual image of the building 33 generated for each direction in the storage 8. At this time, the controller 9 causes the storage 8 to store the virtual image generated by the user in association with the orientation of the display device 1 detected by the second detector 6 during tracing. After all the virtual images have been stored, the controller 9 generates a 3D image by combining the plurality of virtual images stored in the storage 8 on the basis of the orientation of the display device 1 associated with each virtual image. Thus, the user can obtain the 3D image of the building 33 by simply tracing the building 33 from a plurality of directions.

A sixth embodiment of the present disclosure will now be described. In addition to the functions described in the first embodiment, the display device 1 according to the present embodiment has a game function. This game is to find a monster in the real world. The monster is made up of a virtual image.

Figure 15A:
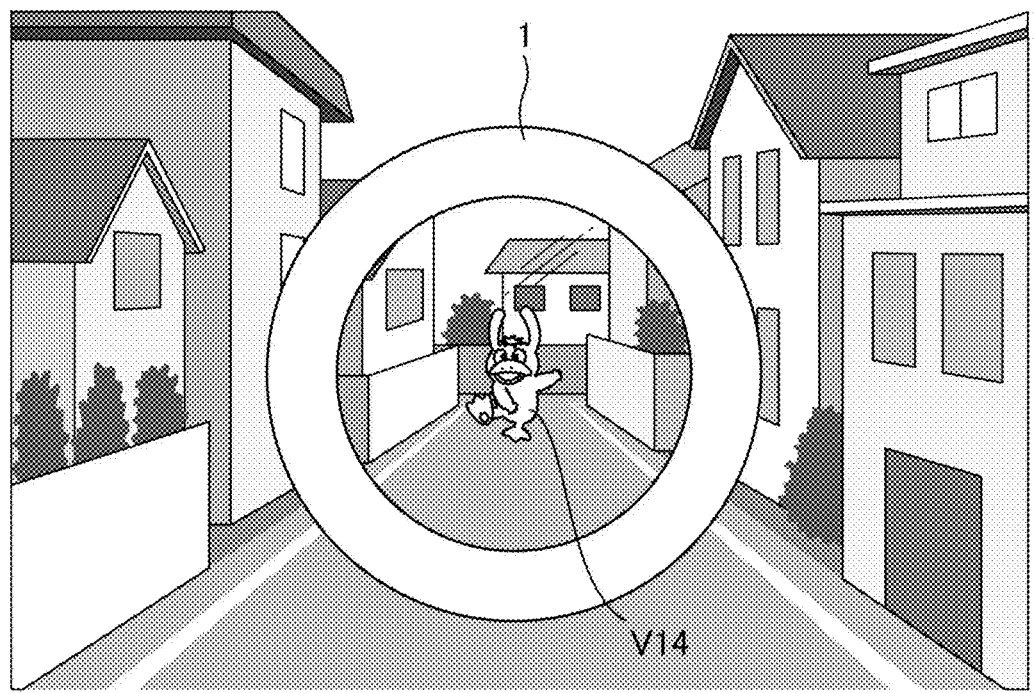
FIGS. 15A and 15B are diagrams depicting how the display device according to a sixth embodiment of the present disclosure is used.
Figure 15B:
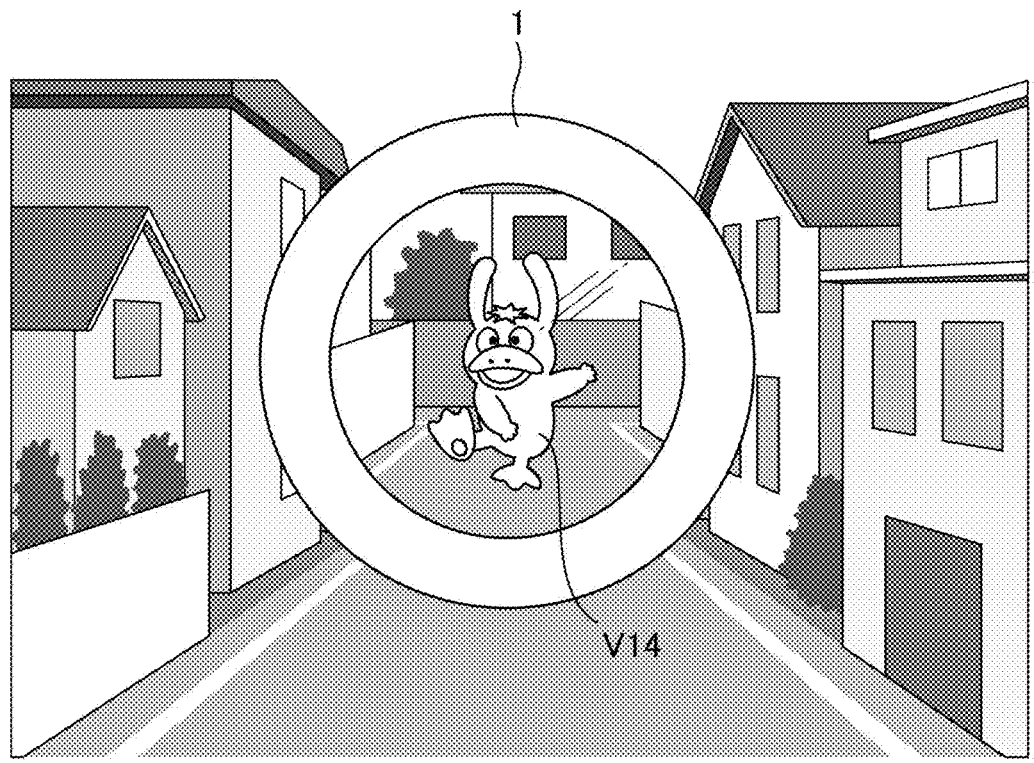

FIGS. 15A and 15B are diagrams depicting how the display device 1 according to the present embodiment is used. In the initial state depicted in FIG. 15A, the controller 9 according to the present embodiment is in the AR1 mode, and the user views the landscape in the real world on the other side of the display device 1 through the display 2. In this state, the controller 9 according to the present embodiment displays a monster image V14 on the display 2. The monster image V14 is a virtual image. To display the monster image V14, the storage 8 according to the present embodiment stores each of a plurality of monster images in association with corresponding position information in advance.

Figure 16:
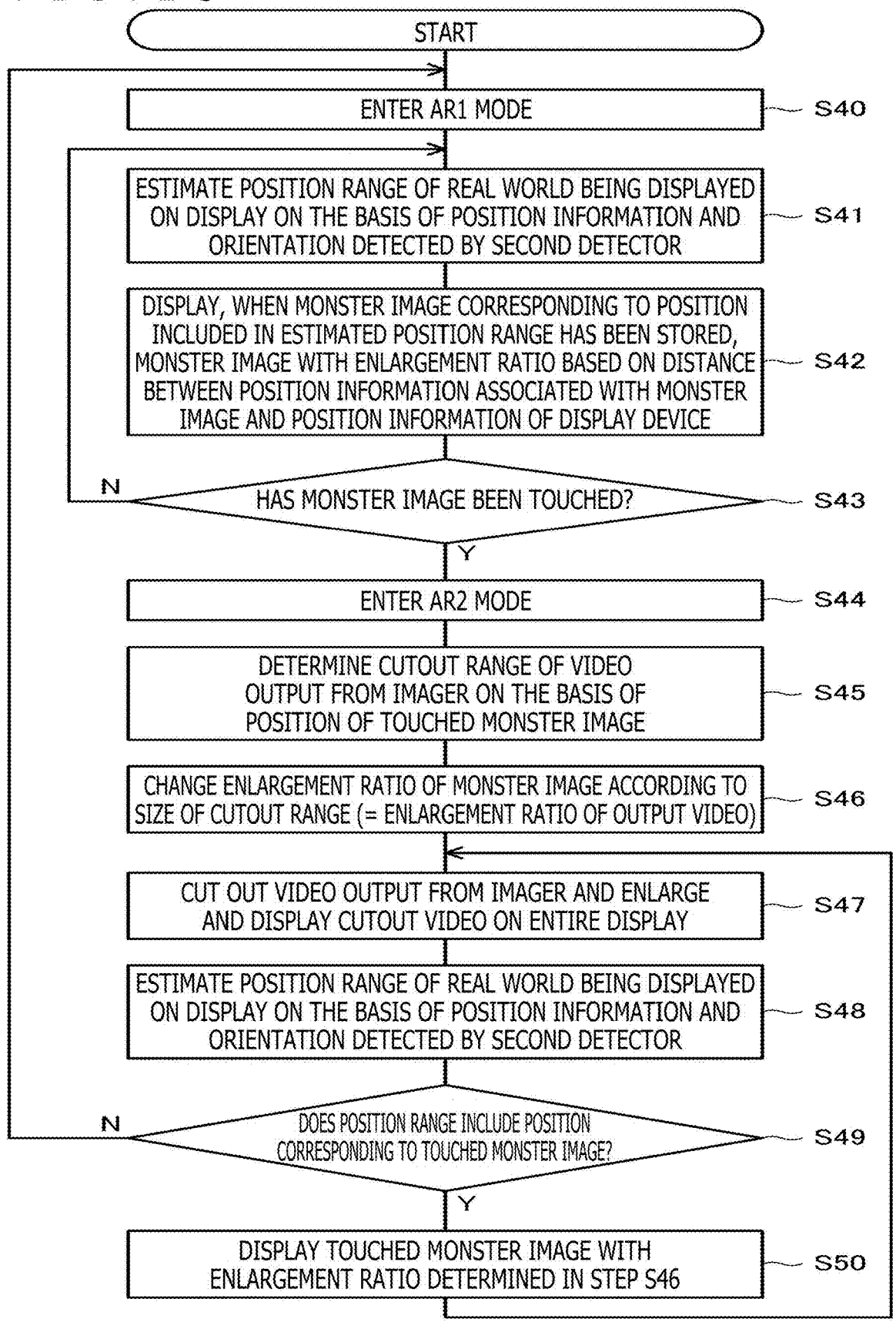
FIG. 16 is a flowchart of the operation of the controller of the display device according to the sixth embodiment of the present disclosure.

FIG. 16 is a flowchart of the operation of the controller 9 of the display device 1 according to the present embodiment. Hereinafter, the operation of the controller 9 according to the present embodiment will be described with reference to the flowchart.

The controller 9 enters the AR1 mode (S40) and sets the transmittance of the display 2 to the first value. The controller 9 estimates the position range of the real world being displayed on the display 2 on the basis of the position information and orientation detected by the second detector 6 (S41). When a monster image corresponding to a position included in the estimated position range has been stored in the storage 8, the controller 9 displays, on the display 2, the monster image superimposed on the landscape in the real world, as depicted in FIG. 15A (S42).

At S42, the controller 9 controls an enlargement ratio on the basis of the distance between the position information, which is stored in the storage 8 in association with each monster image, and the current position of the display device 1. Accordingly, the user experience is such that the monster that is farther away appears smaller in size. Controlling the enlargement ratio, however, may lead to a situation where the user can recognize the monster in the distance but cannot view the monster well. The user in this situation often desires to enlarge the monster for better view. The operations in and after S43 are performed to satisfy such user's desire.

The controller 9 determines whether the monster image being displayed has been touched (S43). When the controller 9 determines that the monster image has not been touched, the controller 9 returns to S41 to continue the operation. When the controller 9 determines that the monster image has been touched, the controller 9 enters the AR2 mode (S44) and determines a cutout range (position and size) of a video output from the imager 4 on the basis of the position of the touched monster image (S45). The controller 9 determines the position of the cutout range so as to include the monster image in the cutout range. Preferably, the controller 9 makes the cutout range smaller in size when the distance from the monster (the distance between the position information stored in the storage 8 in association with the monster image and the current position of the display device 1) is greater. Alternatively, the user may set the size of the cutout range in advance.

The controller 9 changes the enlargement ratio of the monster image according to the size of the cutout range determined at S45 (S46). For example, when the size of the cutout range corresponds to a quarter of the area of the video output from the imager 4, the controller 9 sets the enlargement ratio of the monster image such that the monster image is enlarged in area by four times.

According to the cutout range determined at S45, the controller 9 cuts out the video output from the imager 4 and enlarges and displays the cutout video on the entire display 2, as depicted in FIG. 15B (S47). The controller 9 estimates the position range of the real world being displayed on the display 2 on the basis of the position information and orientation detected by the second detector 6 (S48). The controller 9 determines whether the position range includes the position corresponding to the touched monster image (S49). When the controller 9 determines that the position range does not include the position corresponding to the touched monster image, the controller 9 returns to the operation in the AR1 mode at S40. When the controller 9 determines that the position range includes the position corresponding to the touched monster image, the controller 9 displays the touched monster image with the enlargement ratio determined at S46, as depicted in FIG. 15B (S50). The controller 9 returns to S47 to continue the operation in the AR2 mode.

The determination at S49 is made because when the user moves the display device 1, the monster may go out of the range of the real world being displayed on the display 2. When the controller 9 determines at S49 that the position range does not include the position corresponding to the touched monster image, the controller 9 returns to the AR1 mode. With this configuration, when the monster image that has been displayed is no longer displayed on the display 2, the controller 9 can promptly return to the AR1 mode.

According to the present embodiment, the user can enlarge and view the monster in the distance by touching the monster image. Moreover, since the video of the surrounding real world is enlarged at the same time, the user can view the enlarged monster image without a feeling of strangeness.

Figure 17A:
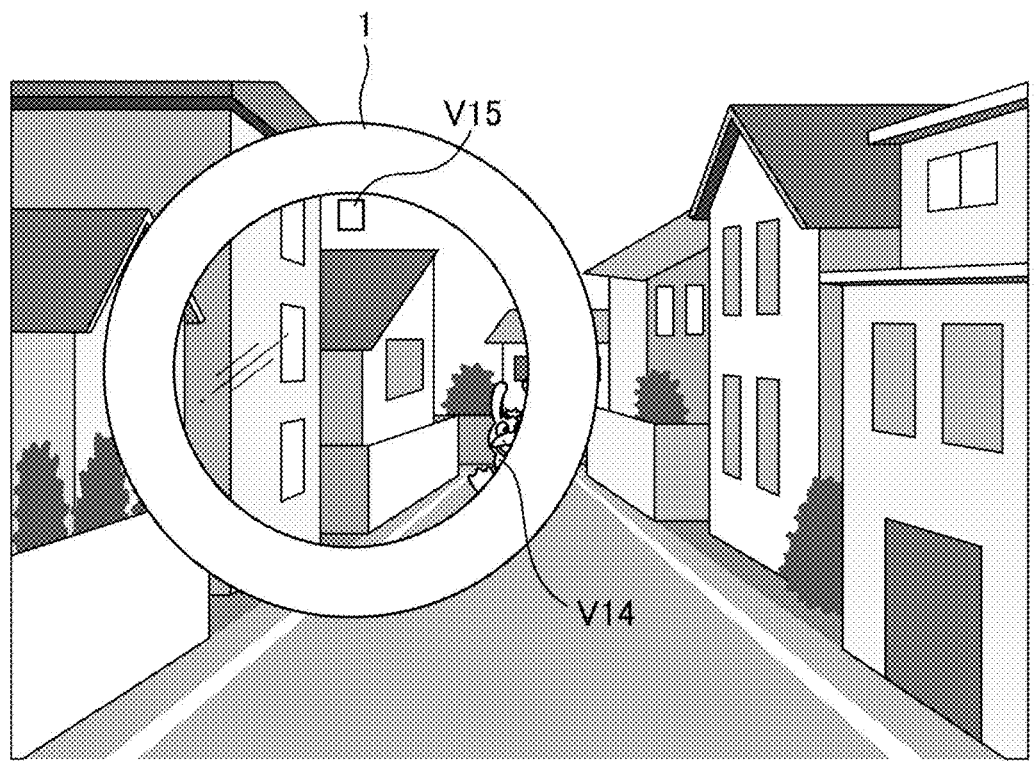
FIGS. 17A and 17B are diagrams depicting how the display device according to a modification of the sixth embodiment of the present disclosure is used.
Figure 17B:
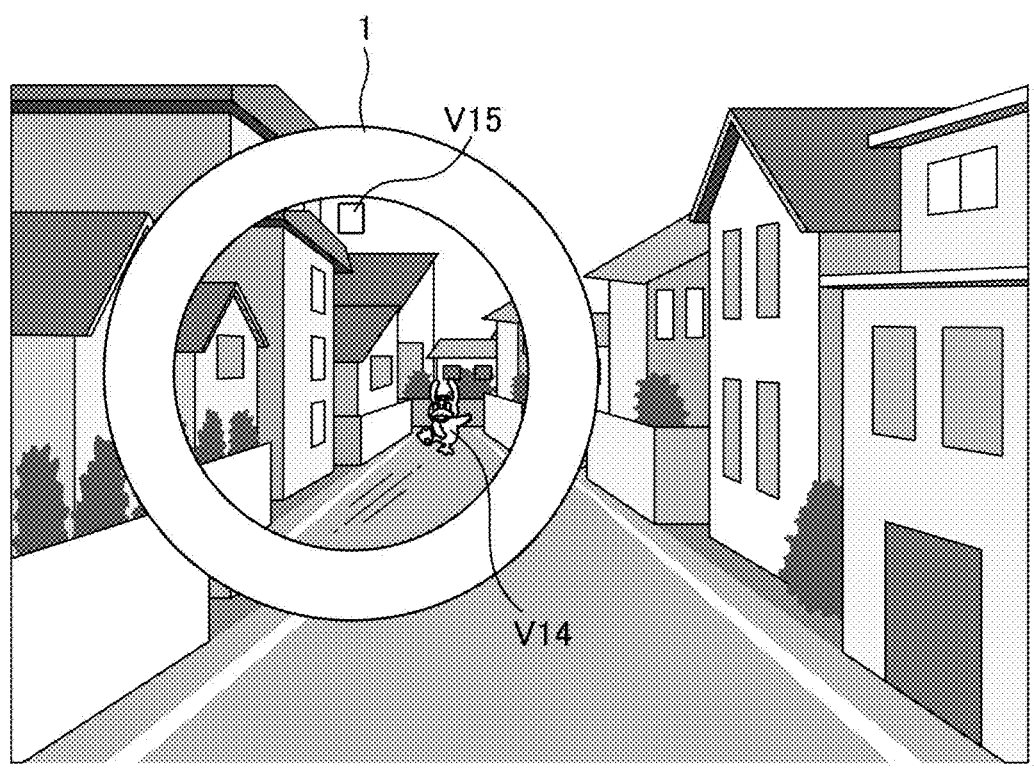

FIGS. 17A and 17B are diagrams depicting how the display device 1 according to a modification of the present embodiment is used. The display device 1 according to the present modification is different from the display device 1 according to the present embodiment in that when displayed, the video output from the imager 4 is not increased in size but reduced in size.

In the initial state depicted in FIG. 17A, the controller 9 is in the AR1 mode as in FIG. 15A. The controller 9 of the display device 1 according to the present modification displays a switching button V15 on the display 2. When the user touches the switching button V15, the controller 9 switches its mode to the AR2 mode and sets the magnification of the imager 4 to a predetermined value smaller than 1. Then, the controller 9 switches the display on the display 2 to the (entire) video output from the imager 4, which is a camera. The controller 9 also displays, on the display 2, the monster image with an enlargement ratio (reduction ratio) equal to the magnification of the imager 4. Accordingly, as depicted in FIG. 17B, a wider range of video is displayed on the display 2, together with the monster image.

Since the user does not know the position of the monster (the position information stored as the position of the monster image in the storage 8) beforehand, the user may not successfully be able to capture the monster image on the display 2, as depicted in FIG. 17A. Even in such a case, the user can view a wider range by pressing the switching button V15. Therefore, the user can search for the monster more easily.

A seventh embodiment of the present disclosure will now be described. In addition to the functions described in the first embodiment, the display device 1 according to the present embodiment has a function of displaying a medical image. Specifically, when the controller 9 is in the AR1 mode, a fluoroscopic image such as an X-ray image is displayed. When the controller 9 is in the non-AR mode, a cross-sectional image of an arbitrary cross-section is displayed. The cross-sectional image is generated from volume data such as computed tomography (CT) and magnetic resonance imaging (MRI).

FIGS. 18A to 18E are diagrams depicting how the display device 1 according to the present embodiment is used. The above-described fluoroscopic image and volume data are associated with each other on the basis of patient information (ID) and stored in the storage 8 according to the present embodiment.

Figure 19:
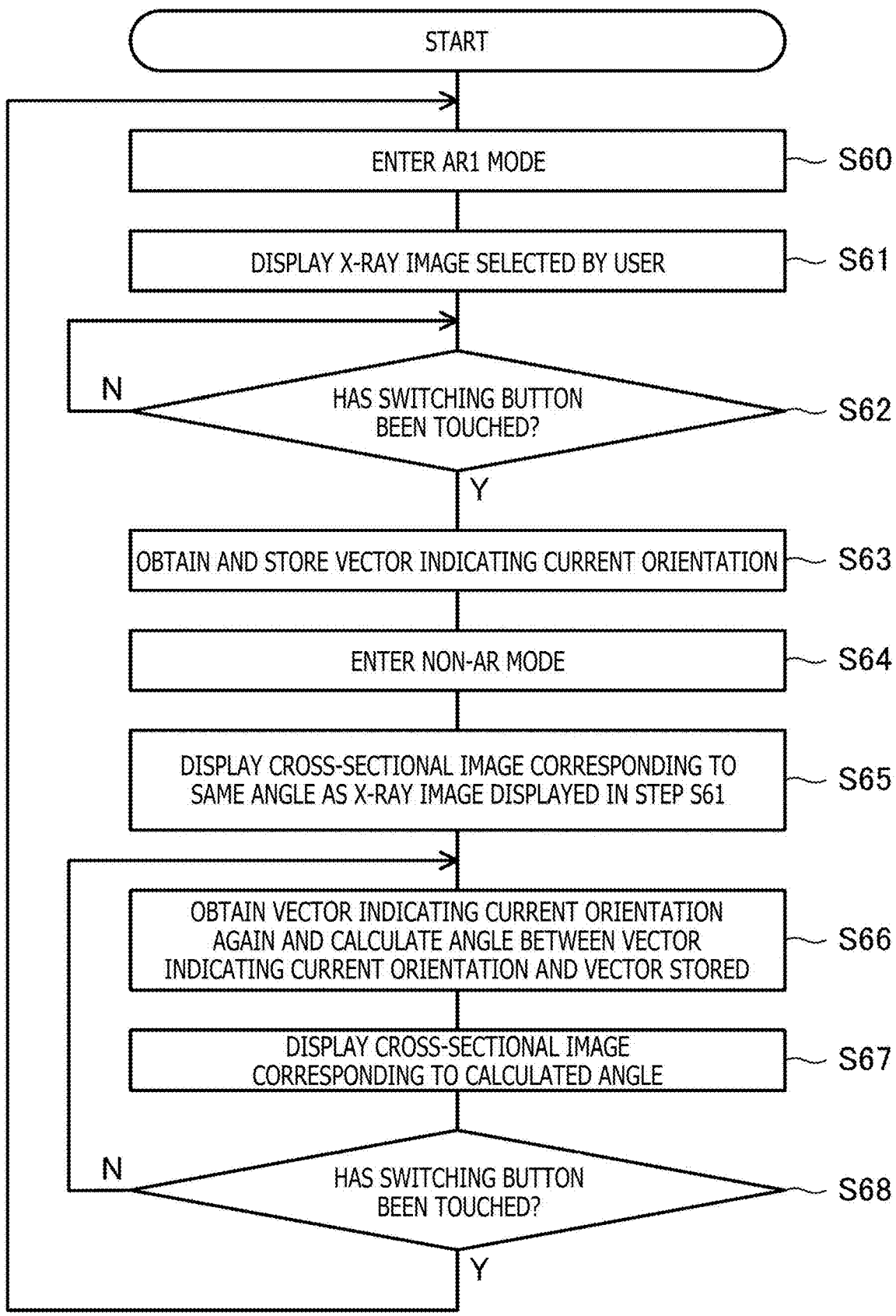
FIG. 19 is a flowchart of the operation of the controller of the display device according to the seventh embodiment of the present disclosure.

FIG. 19 is a flowchart of the operation of the controller 9 of the display device 1 according to the present embodiment. Hereinafter, the operation of the controller 9 according to the present embodiment will be described with reference to the flowchart.

Figure 18A:
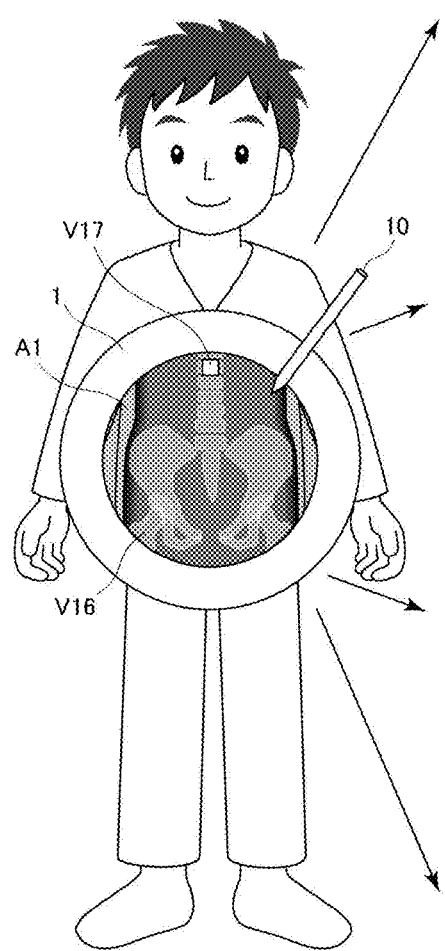
FIGS. 18A to 18E are diagrams depicting how the display device according to a seventh embodiment of the present disclosure is used.
Figure 18B:
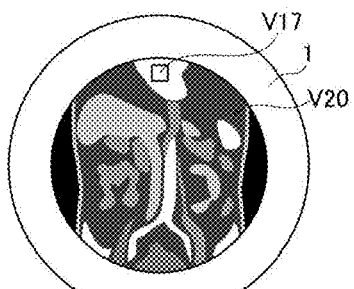
Figure 18C:
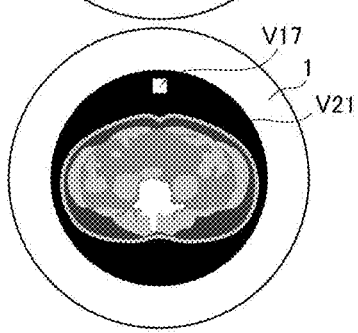
Figure 18D:
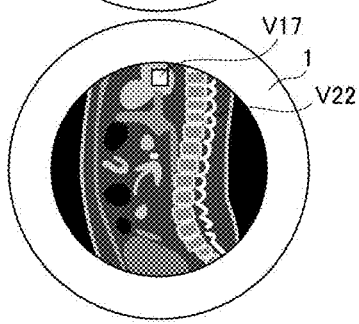
Figure 18E:
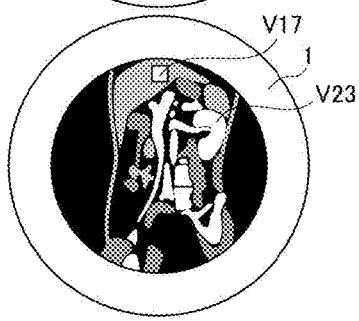

In order to determine the initial position, the controller 9 instructs the user to place the display device 1, for example, on the head of the user with the display 2 of the display device 1 facing upward (for example, this instruction information is displayed on the display 2). After the initial position has been set, various sensors of the second detector 6 detect movement from the initial position. The controller 9 enters the AR1 mode (S60) and sets the transmittance of the display 2 to the first value. As depicted in FIG. 18A, a fluoroscopic image V16 is displayed on the display 2 on the basis of the information detected by the second detector 6 (S61). The fluoroscopic image V16 corresponds to the position of the patient viewed from the front. At this time, the controller 9 also displays a switching button V17 on the display 2. When displaying the fluoroscopic image V16, the controller 9 processes a portion corresponding to the outside of the human body to be transparent. As a result, as depicted in FIG. 18A, an area A1 is provided around the fluoroscopic image V16. Through the area A1, the user can view the other side of the display device 1.

In FIG. 18A, the display device 1 displaying the fluoroscopic image V16, which is a fluoroscopic image of the abdomen, is held in front of the abdomen of the patient. By holding the display device 1 in this manner, the user of the display device 1 can treat the fluoroscopic image as if the inside of the abdomen of the patient is see through.

The controller 9 that has displayed the fluoroscopic image V16 at S61 determines whether the user has touched the switching button V17 (S62). When the controller 9 determines that the user has not touched the switching button V17, the controller 9 continues to display the fluoroscopic image V16. When the controller 9 determines that the user has touched the switching button V17, the controller 9 obtains a vector indicating the current orientation of the display device 1 from the second detector 6 and stores the vector in the storage 8 (S63). Subsequently, the controller 9 enters the non-AR mode (S64) and sets the transmittance of the display 2 to the minimum value. The controller 9 displays, on the display 2, a cross-sectional image that has been stored in the storage 8 in association with the same angle as the fluoroscopic image V16 displayed at S61 (S65). In the example in FIG. 18A, since the fluoroscopic image V16 is captured from the front of the patient, the controller 9 displays a coronal image V20 depicted in FIG. 18B at S65. In this manner, the images are switched naturally for the user.

Subsequently, the controller 9 obtains a vector indicating the current orientation of the display device 1 from the second detector 6 again and calculates an angle (rotation matrix) between the vector indicating the current orientation and the vector stored at S63 (S66). Then, the controller 9 updates the display on the display 2 with a cross-sectional image corresponding to the calculated angle (S67). For example, when the calculated angle indicates that the display device 1 has been turned upward by 90°, the controller 9 updates the display on the display 2 with an axial image V21 depicted in FIG. 18C. When the calculated angle indicates that the display device 1 has been turned rightward by 90°, the controller 9 updates the display on the display 2 with a sagittal image V22 depicted in FIG. 18D.

After S67, the controller 9 determines again whether the user has touched the switching button V17 (S68). When the controller 9 determines that the user has not touched the switching button V17, the controller 9 returns to S66 to continue to display the cross-sectional image in the non-AR mode. When the controller 9 determines that the user has touched the switching button V17, the controller 9 returns to S60 to display a fluoroscopic image in the AR1 mode. In subsequent S61, the controller 9 may display a fluoroscopic image, not depicted, corresponding to the angle calculated last.

As described above, according to the present embodiment, when the controller 9 is in the AR1 mode, the controller 9 displays a fluoroscopic image. When the controller 9 is in the non-AR mode, the controller 9 displays a cross-sectional image. Moreover, when the controller 9 is switched from the AR1 mode to the non-AR mode, the controller 9 displays the cross-sectional image captured at the same plane as the imaging plane of the fluoroscopic image that has been displayed. In this manner, the images are switched naturally for the user. Further, while displaying the cross-sectional image in the non-AR mode, the controller 9 generates a cross-sectional image from volume data according to the tilt of the display device 1. As a result, the cross-sectional images are switched naturally for the user.

In the present embodiment, when the user inputs to the display 2 using the electronic pen 10 while a fluoroscopic image or a cross-sectional image is displayed, stroke data generated by this input may be stored in the storage 8 in association with the image being displayed. This allows the user to check the input contents later again.

An eighth embodiment of the present disclosure will now be described. In addition to the functions described in the first embodiment, the display device 1 according to the present embodiment has a function of displaying additional information such as a correct answer to an exam question.

FIGS. 20A and 20B are diagrams depicting how the display device 1 according to the present embodiment is used. When the controller 9 according to the present embodiment activates an additional-information displaying function, the controller 9 authenticates the user using an ID and password, for example. With this configuration, only a person (an examiner, for example) who knows the ID and password can activate the additional-information displaying function.

The storage 8 according to the present embodiment stores, in advance, the structure of an exam paper for which the additional-information displaying function is activated. The structure includes the position of each of one or more answer columns. The storage 8 also stores a correct answer for each answer column in advance. An exam paper 34 depicted in FIG. 20A is an example of the exam paper and includes one or more answer columns 34a.

The controller 9 activates the additional-information displaying function and enters the AR1 mode or the AR2 mode. Subsequently, the controller 9 starts capturing a video using the imager 4. The controller 9 causes the imager 4 to continue to capture the video until the exam paper stored in the storage 8 appears in the video output from the imager 4. When the exam paper stored in the storage 8 has appeared, the controller 9 determines the position of each of the answer column(s) included in the exam paper in the video on the basis of the position of the exam paper in the video. Since the display device 1 does not usually stay at one place, the controller 9 continuously determines the position of each of the answer column(s) at a predetermined interval.

Each time the controller 9 has determined the position of each of the answer column(s), the controller 9 determines whether the determined position is included inside the display 2. For the answer column determined to be included inside the display 2, the controller 9 displays a correct answer at a corresponding position within the display 2. The correct answer to be displayed is stored in the storage 8 in association with each of the answer column(s). In this manner, the user can view the correct answer of each of the answer column(s) on the display 2.

The paper for which the present embodiment is applied is not limited to an exam paper. Similarly to the exam paper, the display device 1 is capable of displaying a correct answer for each of one or more answer columns provided in a textbook, a reference book, a workbook, or the like.

Additionally, when the user touches an area inside the display 2 that corresponds to one of the answer columns, the controller 9 may display further additional information (for example, explanations) related to the answer column. In this case, the additional information is stored in advance in the storage 8 in association with each of the answer column(s). The controller 9 may enter the non-AR mode and display the additional information using the entire display 2. In addition, the controller 9 may display a switching button at the same time when displaying the additional information. When the user touches the switching button, the controller 9 may return to display the correct answer for the answer column.

Although the embodiments of the present disclosure have been described above, the present disclosure is not limited to these embodiments and may be implemented in various other embodiments without departing from the scope of the present disclosure.

For example, in each of the embodiments above, description has been made on the premise that the display device 1 supports three of the non-AR mode, the AR1 mode, and the AR2 mode. However, at least part of the present disclosure may be implemented by the display device 1 supporting one of the AR1 mode and the AR2 mode. For example, in the example in FIGS. 4A to 4C, even if the display device 1 does not support the AR2 mode, the display mode of the virtual image may be switched between the non-AR mode in FIG. 4A and the AR1 mode in FIG. 4B. Further, even if the display device 1 does not support the AR1 mode, the display mode of the virtual image may be switched between the non-AR mode in FIG. 4A and the AR2 mode in FIG. 4C.

In each of the above-described embodiments, the display device 1 has a circular shape. Alternatively, the display device 1 may have another shape such as a quadrangle.

What is claimed is:

1. A display device comprising:
    a display having transparency;
    a detector which, in operation, detects position information and orientation information of the display; and
    a controller which, in operation, controls the display to display a first virtual image and a second virtual image based on the position information and the orientation information of the display and a display mode of the display, wherein the controller controls the display to change from displaying the first virtual image based on first position information and orientation information and a first display mode in which the display has a first transparency to displaying the second virtual image based on second position information and orientation information and a second display mode in which the display has a second transparency, the second display mode being different from the first display mode, and the second transparency being different from the first transparency.

2. The display device according to claim 1, wherein:
    the controller, in operation, displays a mark on the first virtual image based on the position information and orientation information of the display, and
    the second virtual image corresponds to a portion of the first virtual image in a vicinity of the mark displayed on the first virtual image.

3. The display device according to claim 1, further comprising:
    a detector which, in operation, detects a position indicated by an indicator on the display,
    wherein, in response to determining that the position indicated by the indicator includes a position on the first virtual image, the controller changes from displaying the first virtual image based on the first position information and orientation information and the first display mode in which the display has the first transparency to displaying the second virtual image based on the second position information and orientation information and the second display mode in which the display has the second transparency.

4. The display device according to claim 3, wherein:
    the controller controls the display to change to a third display mode in which the display has a third transparency smaller than the first transparency and the second virtual image is superimposed on a video output from an imager to display the second virtual image superimposed on the video on the display.

5. The display device according to claim 1, further comprising:
a detector which, in operation, detects a position indicated by an indicator on the display,
wherein the controller, in operation, controls a transparency of the display based on the position indicated by the indicator on the second virtual image.

6. The display device according to claim 1, further comprising:
a detector which, in operation, detects a position indicated by an indicator on the display,
wherein the controller, in operation, generates stroke data based on the position indicated by the indicator and causes the display to display the stroke data.

7. The display device according to claim 1, wherein:
the controller, in operation, changes an enlargement ratio of the first virtual image.

8. A method for controlling a display device including a display having transparency, the method comprising:
detecting position information and orientation information of the display;
displaying a first virtual image and a second virtual image based on the position information and the orientation information of the display and a display mode of the display; and
controlling the display to change from displaying the first virtual image based on first position information and orientation and a first display mode in which the display has a first transparency to displaying the second virtual image based on second position information and orientation information and a second display mode in which the display has a second transparency, the second display mode being different from the first display mode, and the second transparency being different from the first transparency.

9. The method for controlling the display device according to claim 8, further comprising:
displaying a mark on the first virtual image based on the position information and orientation information of the display,
wherein the second virtual image corresponds to a portion of the first virtual image in a vicinity of the mark displayed on the first virtual image.

10. The method for controlling the display device according to claim 8, further comprising:
detecting a position indicated by an indicator on the display; and
the controlling includes controlling the display to change from displaying the first virtual image based on the first position information and orientation information and the first display mode in which the display has the first transparency to displaying the second virtual image based on the second position information and orientation information and the second display mode in which the display has the second transparency in response to determining that the position indicated by the indicator includes a position on the first image.

11. The method for controlling the display device according to claim 10, further comprising:
controlling the display to change to a third display mode in which the display has a third transparency smaller than the first transparency and the second virtual image is superimposed on a video output from an imager to display the second virtual image superimposed on the video on the display.

12. The method for controlling the display device according to claim 8, further comprising:
detecting a position indicated by an indicator on the display;
wherein the controlling includes controlling a transparency of the display based on the position indicated by the indicator on the second virtual image.

13. The method for controlling the display device according to claim 8, further comprising:
detecting a position indicated by an indicator on the display;
generating stroke data based on the position indicated by the indicator; and
displaying the stroke data on the display.

14. The method for controlling the display device according to claim 8, further comprising:
changing an enlargement ratio of the first virtual image.

* * * * *